(12) United States Patent
Tait

(10) Patent No.: US 9,429,205 B2
(45) Date of Patent: Aug. 30, 2016

(54) ELASTOMERIC ISOLATOR

(71) Applicant: McMaster University, Hamilton (CA)

(72) Inventor: Michael Tait, Dundas (CA)

(73) Assignee: McMaster University (CA)

( * ) Notice: Subject to any disclaimer, the term of this patent is extended or adjusted under 35 U.S.C. 154(b) by 0 days.

(21) Appl. No.: 14/488,053

(22) Filed: Sep. 16, 2014

(65) Prior Publication Data

US 2015/0076755 A1    Mar. 19, 2015

Related U.S. Application Data

(60) Provisional application No. 61/878,745, filed on Sep. 17, 2013.

(51) Int. Cl.
| | |
|---|---|
| *F16F 1/366* | (2006.01) |
| *E02D 31/08* | (2006.01) |
| *E04H 9/02* | (2006.01) |
| *E01D 19/04* | (2006.01) |
| *B32B 25/10* | (2006.01) |

(52) U.S. Cl.
CPC .............. *F16F 1/366* (2013.01); *B32B 25/10* (2013.01); *E01D 19/041* (2013.01); *E02D 31/08* (2013.01); *E04H 9/022* (2013.01); *B32B 2262/0269* (2013.01); *B32B 2262/101* (2013.01); *B32B 2262/106* (2013.01); *B32B 2419/00* (2013.01)

(58) Field of Classification Search
CPC ........... E04H 9/022; B32B 7/00; B32B 7/02; B32B 25/10; F16F 1/40
USPC ....... 52/167.1, 167.2, 167.7, 167.8; 267/262, 267/294, 152, 153
See application file for complete search history.

(56) References Cited

U.S. PATENT DOCUMENTS

| | | | | |
|---|---|---|---|---|
| 5,161,338 | A * | 11/1992 | Tada ......................... | B32B 7/02 52/167.1 |
| 2004/0123530 | A1* | 7/2004 | Dorfmann ............... | E04H 9/022 52/167.1 |
| 2010/0088980 | A1* | 4/2010 | Russo ..................... | E04H 9/022 52/167.7 |
| 2010/0162640 | A1* | 7/2010 | Drysdale ................. | B32B 25/10 52/167.7 |

* cited by examiner

*Primary Examiner* — Melanie Torres Williams
(74) *Attorney, Agent, or Firm* — Steven M. Greenberg; CRGO Law

(57) ABSTRACT

Unbonded fiber reinforced elastomeric isolators (FREIs) have desirable characteristics for seismic isolation, but the unbonded application also introduces several design limitations in comparison to bonded elastomeric isolators. Unbonded FREIs are not capable of resisting tensile forces, making this type of isolator inappropriate for situation where overturning is of concern or regions where large vertical accelerations are anticipated. Furthermore, since unbonded FREIs rely on friction to transfer horizontal forces, permanent slip could occur. Concerns over both transfer of tensile forces and permanent displacement can be obviated by partially bonding the FREI to the supports. In this way, partially bonded FREIs (PB-FREIs) retain the beneficial characteristics of an unbonded FREI, but also demonstrate characteristics of a bonded isolator, notably tensile forces can be transferred and potential permanent displacement is inhibited.

9 Claims, 22 Drawing Sheets

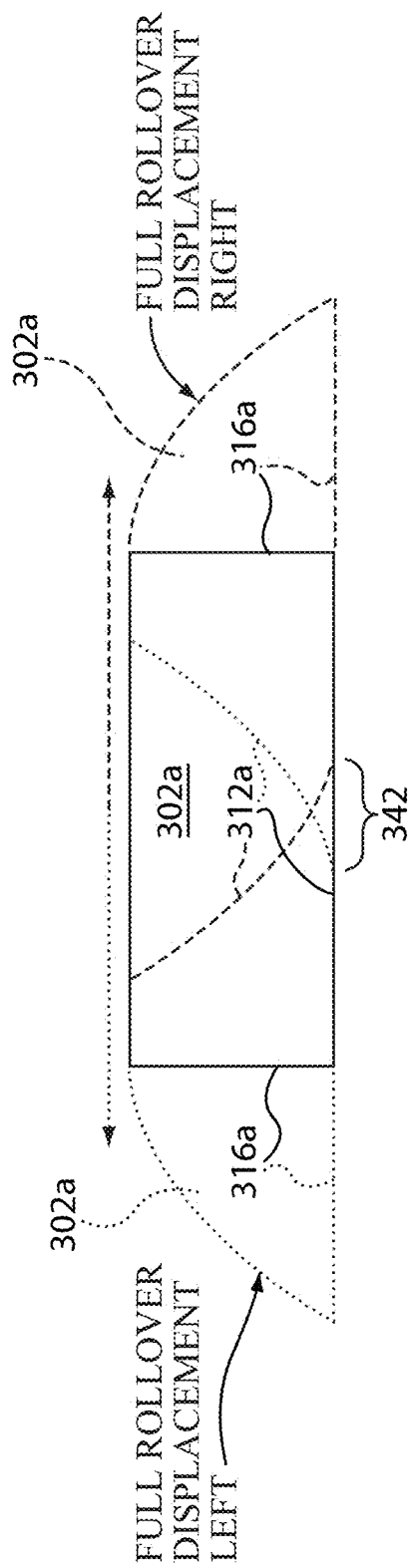
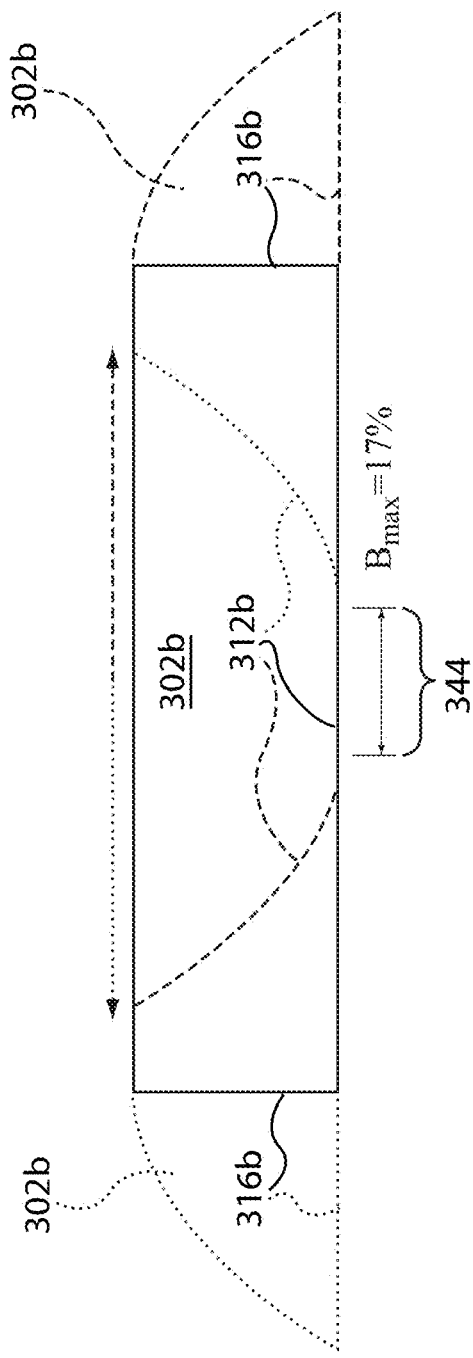
Figure 3a
Figure 3b

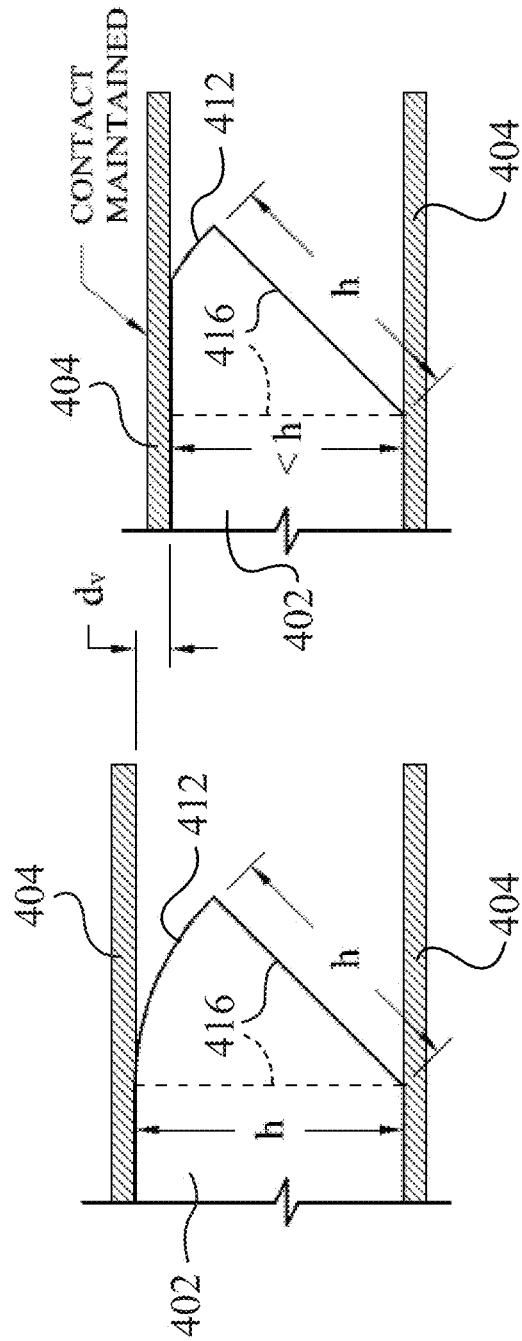

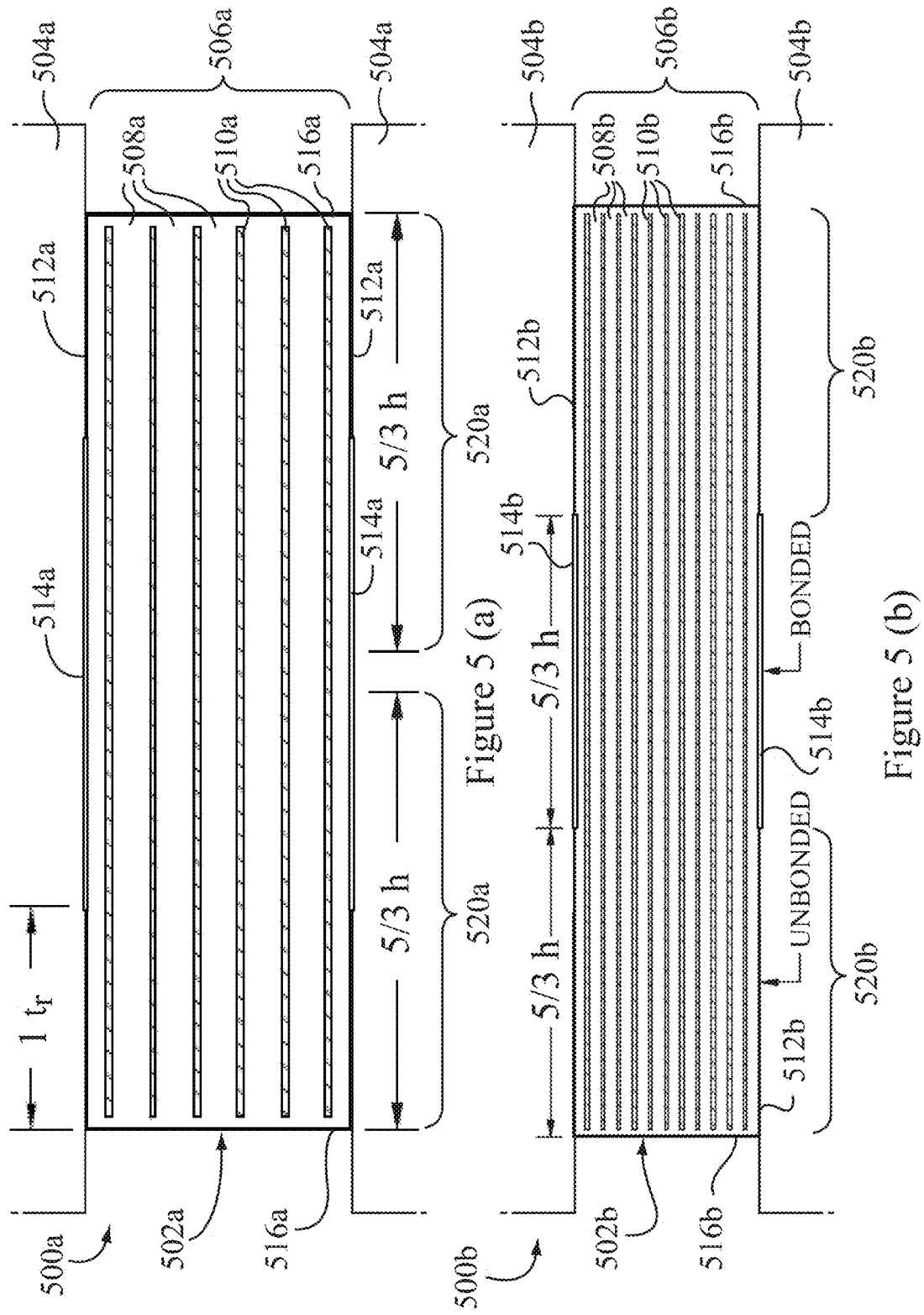

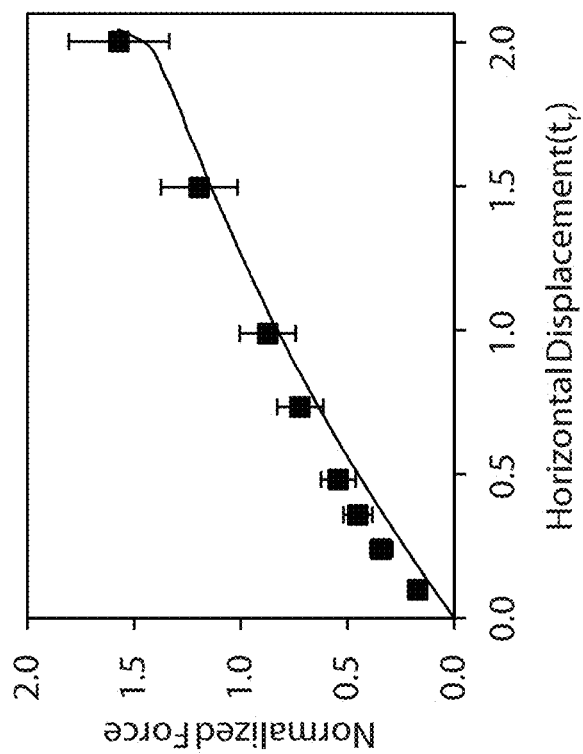
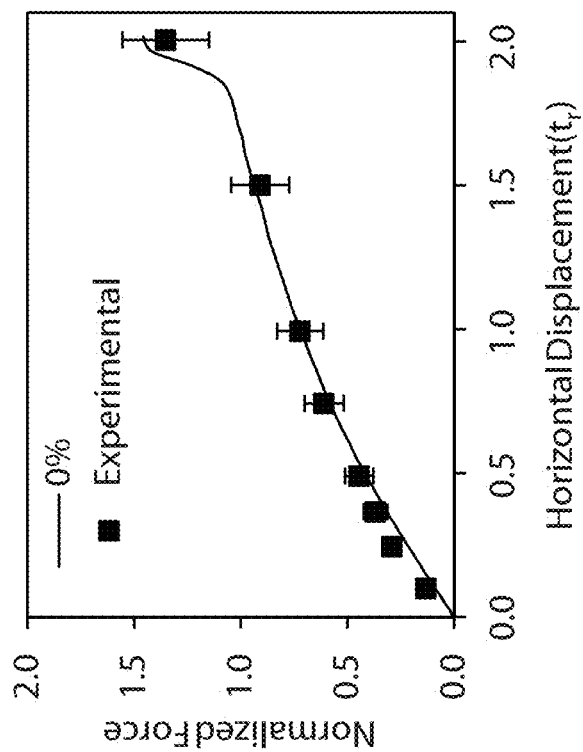
Figure 10(b)
Figure 10(a)

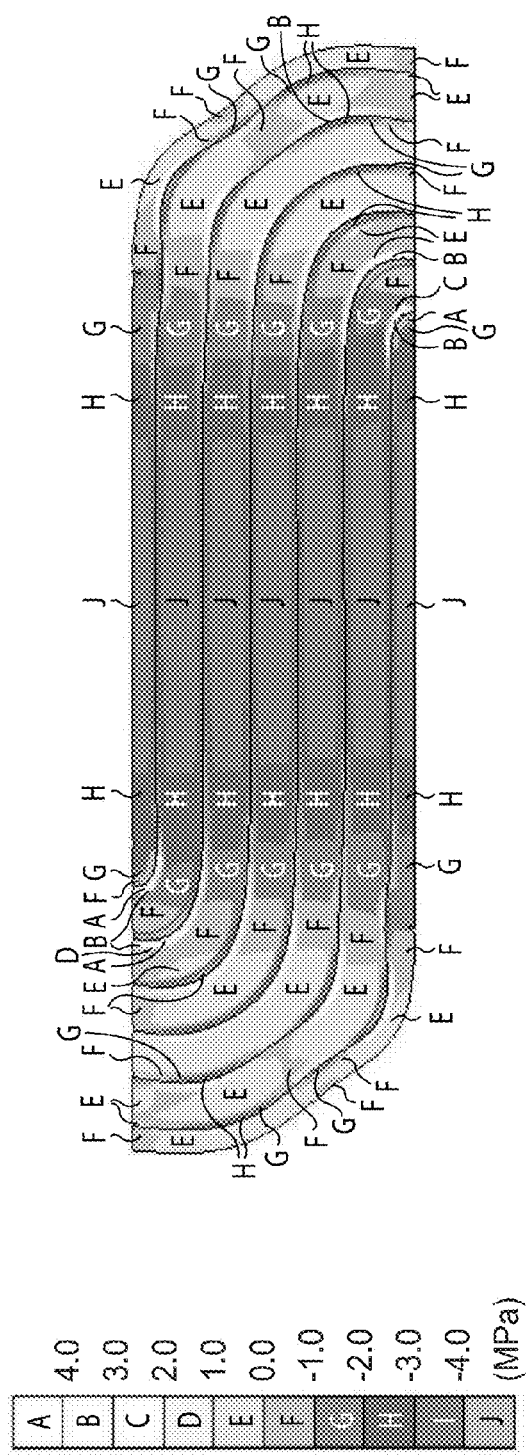
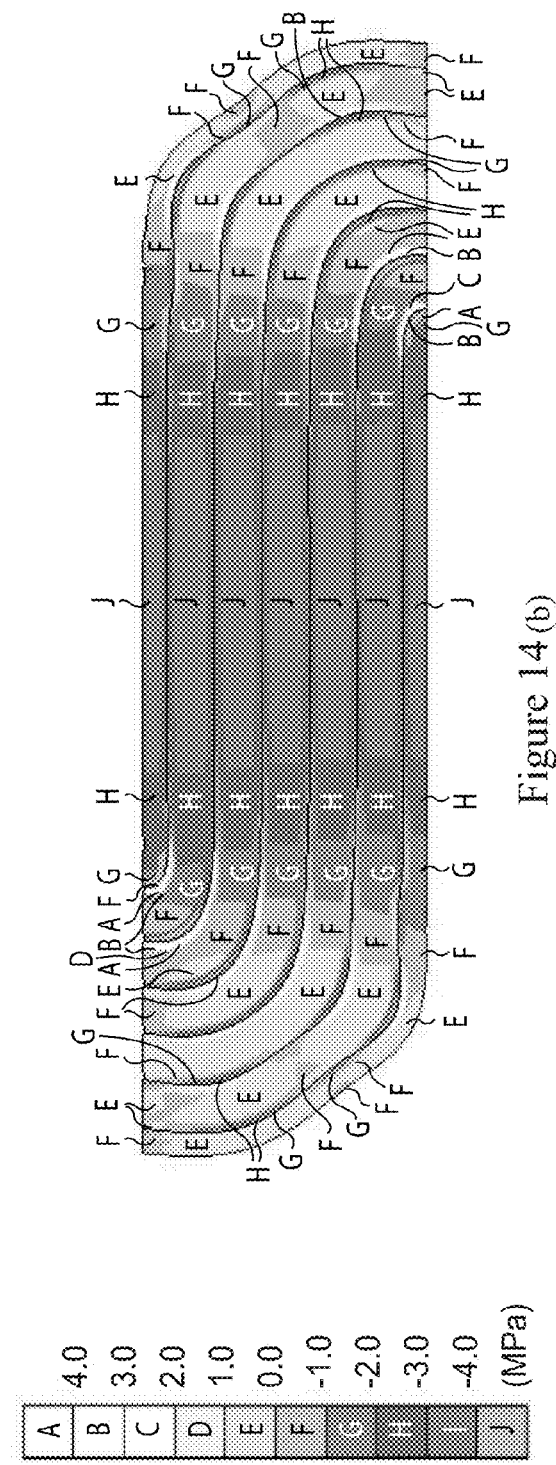
Figure 14(a)
Figure 14(b)

ELASTOMERIC ISOLATOR

CROSS-REFERENCE TO RELATED APPLICATION

This application claims priority to U.S. Provisional Application No. 61/878,745 filed Sep. 17, 2014, the teachings of which are hereby incorporated by reference.

TECHNICAL FIELD

The present disclosure pertains to the field of construction. More particularly, the present invention is in the technical field of seismic mitigation and isolation in the construction industry.

BACKGROUND

The concept of Fiber Reinforced Elastomeric Isolators (FREIs) was initially proposed to reduce the high cost and weight associated with conventional Steel Reinforced Elastomeric Isolators (SREIs) (Kelly, 1999). SREIs are bearings comprising a laminate structure of alternating layers of elastomeric material and steel sheet reinforcement, with the external layers being of elastomeric material. FREI bearings are similar to SREI bearings, except that the reinforcement takes the form of fiber rather than steel sheet. Thus, the laminate structure of an SREI bearing comprises a plurality of layers of elastomeric material, two of which form external layers of the laminate structure and define opposed contact surfaces of the isolator body, and a plurality of layers of fiber reinforcement. Each layer of fiber reinforcement is disposed between a pair of adjacent layers of elastomeric material, and each pair of adjacent layers of elastomeric material is bonded together across the layer of fiber reinforcement disposed therebetween. Construction of SREI bearings is known in the art, and is described, for example, in U.S. Pat. No. 8,291,651 to Drysdale et al., the teachings of which are hereby incorporated by reference in their entirety.

Experimental testing of FREIs revealed that similar performance to SREIs could be obtained with the benefit of additional damping attributed to the inter-fiber movement of the reinforcement (Kelly 1999).

In addition to replacing the steel reinforcement sheets, the design and installation of FREIs can be further simplified by installing the isolator body unbonded to the supports (i.e. the superstructure and substructure), as taught by U.S. Pat. No. 8,291,651 to Drysdale et al. Drysdale et al. teach FREI bearings that are located between the superstructure and substructure of a building with no bonding at the contact surfaces of the isolator body, which they refer to as an "unbonded application". In such an application, FREI bearings, with the appropriate aspect ratio, exhibit stable rollover deformation.

Reference is now made to FIGS. 1(a) to 1(d) and FIGS. 1(e) to 1(h), which show the behavior of a FREI bearing 100 comprising an isolator body 102 in an unbonded application at different amplitudes of lateral displacement. FIGS. 1(a) to 1(d) show displacement of the upper support 104 to the right and FIGS. 1(e) to 1(h) show displacement of the upper support 104 to the left; the vertical lines 103 are provided to show relative displacement. FIGS. 1(a) and 1(e) show displacement of 0% $t_r$, FIGS. 1(b) and 1(f) show displacement of 100% $t_r$, FIGS. 1(c) and 1(g) show displacement of 150% $t_r$ and FIGS. 1(d) and 1(h) show displacement of 200% $t_r$, where $t_r$ is the total thickness of the elastomeric layers. As can be seen in FIGS. 1(a) to 1(d) and FIG. 1(e) to 1(h), in a FREI bearing utilized in unbonded application, as the supports 104 are displaced laterally relative to one another, the contact surfaces 112 (top and bottom faces) of the FREI bearing 100 roll off the upper and lower contact supports 104, respectively. This lateral deformation is described as "rollover deformation". It occurs as a result of both unbonded application and the lack of flexural rigidity of the fiber reinforcement sheets. A properly designed FREI bearing can sustain very large lateral displacements while remaining stable, by maintaining a positive incremental lateral load resisting-capacity throughout the hysteresis loops. As such, the resulting permissible deformation is called "stable rollover" (SR) deformation. At the extreme lateral displacements shown in FIGS. 1(d) and 1(h), the free edges 116 engage the upper and lower contact supports 104, inhibiting further lateral displacement and resulting in an observable hardening, which limits the maximum lateral displacement of the FREI bearing 100 and enhances its overall stability.

SR-deformation results in a significant decrease in the horizontal stiffness of the bearing and adds to its efficiency as a seismic isolator. An unbonded FREI bearing that exhibits SR-deformation is described by Drysdale et al. as a "stable unbonded" (SU) FREI (note that Drysdale et al. contains the typographical error "unbounded"). In a SU-FREI bearing, the "full contact vertical face lateral displacement" ($\delta_{fc}$) occurs when the free edges 116 (which, without horizontal displacement of the supports, are the original vertical faces of the isolator body 102) completely engage the horizontal upper and lower supports 104, as shown in FIGS. 1(d) and 1(h). As a result, significant stiffening in the hysteresis loops is observed which effectively places a limit on the extreme lateral displacements that can occur under unanticipated seismic excitation levels. Rollout instability lateral displacement, denoted as $\delta_{max}$, for this particular type of bearing is significantly larger than $\delta_{fc}$.

Placing the isolator body unbonded between the supports prevents the development of moment in the isolator body, thus eliminating the high tensile stress regions that usually develop as the isolator body is displaced horizontally reducing the tensile stress demand on the elastomer (Toopchi-Nezhad et al. 2011). Unlike rigid steel reinforcement, fiber reinforcement is assumed to be extensible and to provide no appreciable resistance in bending. The lack of bending rigidity, combined with the unbonded installation, results in a unique rollover deformation in the end regions that would otherwise be in tension as illustrated in FIG. 2(a) and FIG. 2(b). In FIGS. 2(a) and 2(b), corresponding reference numerals are used for features corresponding to features of the FREI 100 in FIG. 1 except with the prefix "2" instead of "1" and the suffix "a" or "b", respectively. FIG. 2(a) shows the behavior of a SU-FREI 200a, and FIG. 2(b) shows the behavior of a FREI 200b whose contact surfaces 212b have been fully bonded to the supports 204b. The SU-FREI 200a undergoes rollover deformation in the rollover regions 240a adjacent the free edges 216a whereas the FREI 200b whose contact surfaces 212b have been fully bonded to the supports 204b is subjected to tension in the regions 240b along the free edges 216b.

As the horizontal displacement increases and the amount of the isolator contact surface that loses contact with the supports increases, the effective horizontal stiffness decreases. Toopchi-Nezhad et al. (2008) demonstrated experimentally that the reduction in effective horizontal stiffness would result in instability as the tangential stiffness becomes negative. It was determined that by increasing the aspect ratio, defined as the ratio of the width in direction of horizontal displacement (displacement axis of the isolator body) to the total height of the isolator (measured along the free edges of the isolator body), instability could be reduced. In computing the aspect ratio of a FREI, height and width are measured in the unstressed condition (without tension or compression). The increase in horizontal stiffness occurred as the free edges of the isolator contacted the upper and lower supports, completing full rollover. The stiffening of the isolator was identified as an advantageous characteristic both to protect against instability and to prevent excessive displacements during beyond design basis events (Toopchi-Nezhad et al. 2008).

A design limitation associated with unbonded FREIs originates from the unbonded application, which is also responsible for the desirable softening and stiffening characteristics. The unbonded application prevents the transfer of tensile forces through the isolator, making this type of isolator unsuitable for situations where a tensile vertical design load must be resisted. A tensile vertical design load may occur in near fault applications or in situations where overturning is of concern. A vertical design load can occur either as a result of the geometry of the structure or due to the location of the structure in a geographical region with a high expected vertical acceleration component. Provisions for tensile testing are often provided and required in design codes and standards (ISO 2010, ASCE 2010). In general, experimental testing of elastomeric isolators subjected to tension is limited due to difficulties in simultaneously applying a tensile load while displacing the isolator horizontally (Naeim and Kelly, 1999). Theoretical analysis of SREIs has identified that the isolator may also buckle in tension (Kelly and Konstantinidis, 2011). Therefore as the tensile load increases, the horizontal stiffness of a bonded SREI will decrease.

In addition, residual displacement can occur in unbonded FREIs as a result of slip at the interface between the isolator body and the supports if the frictional resistance along the contact surfaces is exceeded. An experimental investigation and literature review on the neoprene-concrete friction relationships was conducted by Magliulo et al. (2011). A comparison among code equations, results from existing studies in the literature, and the experimental data presented in the study demonstrated substantial variation in the friction coefficient as a function of vertical compressive stress. Magliulo et al. (2011) contributed the variation in part to differences in the roughness of the concrete surface. It was stated that in many of the reviewed studies the quality and finish of the concrete surface was not specified or discussed. This variation contributes to uncertainties of the horizontal force transfer capacity of unbonded FREIs.

While conducting an experimental shake table program on a scaled base isolated structure with unbonded FREIs, Foster (2011) identified that slip occurred in a select scaled earthquake record where the seismic demand significantly exceeded the design basis of the isolation system. The resulting residual displacement was observed when the peak displacement of the isolation layer reached 3.11 $t_r$, where $t_r$ is the total thickness of the elastomeric layers. This peak displacement was far in excess of the full rollover displacement of approximately 2.00 $t_r$ for the isolators considered in the study. The level of residual displacement was reduced by 66% when grit paper was introduced to increase the friction between the elastomer and the otherwise steel and aluminum support surfaces. The introduction of grit paper was found to have negligible influence on the response of the structure, but resulted in a substantial decrease in the level of residual displacement. This study demonstrates the importance of frictional properties on the performance of the isolation system in preventing slip at large peak displacements that may occur in beyond design basis events.

Russo and Pauletta (2013) experimentally investigated the friction properties of unbonded FREIs on concrete surfaces with varying vertical compressive stress. In the experimental program it was observed that at the end of a single horizontal displacement cycle that the contact surface of the isolator had some level of residual displacement. The magnitude of the residual displacement was shown to be a function of the vertical compressive stress and the location along the surface of the isolator attributed to the rollover deformation. Moment equilibrium in unbonded FREIs is maintained by a change in the vertical stress distribution; areas of the contact surface with high vertical stress concentrations displayed less residual deformation than areas with lower vertical stress.

From these studies it can be concluded that while the friction properties of unbonded FREIs is an area that necessitates further investigation, another design limitation affecting unbonded FREIs is the potential for residual displacement resulting from slip at the interface between the isolator body and the supports.

Thus, while unbonded FREIs provide the benefit of stable rollover deformation, they do not permit the transfer of tensile forces through the isolator and are subject to residual displacement.

SUMMARY

The above issues can be obviated by partially bonding the isolator body, that is, bonding portions of the contact surfaces of the isolator body disposed inwardly of the free edges thereof, to rigid supports such as steel end plates. This partial bonding provides tensile resistance as well as resistance to residual displacement while retaining the benefits of stable rollover deformation. Accordingly, a partially bonded fiber reinforced elastomeric isolator is provided.

In one aspect, a reinforced elastomeric isolator, comprises an isolator body and a pair of opposed rigid supports. The isolator body has a laminate structure comprising a plurality of layers of elastomeric material, two of which form external layers of the laminate structure and define opposed contact surfaces of the isolator body, and a plurality of layers of fiber reinforcement. Each layer of fiber reinforcement is disposed between a pair of adjacent layers of elastomeric material, and each pair of adjacent layers of elastomeric material being bonded together across the layer of fiber reinforcement disposed therebetween. At least one free edge of the isolator body extends between the contact surfaces about a periphery of the isolator body. The opposed contact surfaces of the isolator body are bonded to respective ones of the opposed rigid supports by respective bonds so that the isolator body is between the opposed rigid supports. The bonds are disposed inwardly of at least one of the at least one free edge of the isolator body.

In one embodiment, the isolator body has an aspect ratio (width over height) of at least about 3.3, where the height is measured along the at least one free edge of the isolator body and the width is measured along a displacement axis of the isolator body. In a particular embodiment, the bonds are disposed inwardly of rollover sections of the opposed contact surfaces.

In one embodiment, for at least one contact surface, at least one outermost bond is located a distance of at least about 5/3 h from the free edge of the isolator body, where h is a height of the isolator body as measured along the at least one free edge of the isolator body. In a particular embodiment, the width of the isolator body, measured along a displacement axis of the isolator body, is at least about (10/3 h+B) where B is the total bond extent, and each outermost bond is located a distance of at least about 5/3 h from each free edge of the isolator body.

In one embodiment, the isolator body has a single free edge forming a circle; in another embodiment the isolator body has four free edges forming a rectangle.

The bonds may be formed by hot vulcanization or by cold vulcanization.

BRIEF DESCRIPTION OF THE FIGURES

Certain embodiments will now be described, by way of example, with reference to the accompanying figures, of which:

FIGS. 1(a) and 1(e) show displacement of 0% $t_r$, FIGS. 1(b) and 1(f) show displacement of 100% $t_r$, FIGS. 1(c) and 1(g) show displacement of 150% $t_r$ and FIGS. 1(d) and 1(h) show displacement of 200% $t_r$ where $t_r$ is the total thickness of the elastomeric layers;

FIG. 3(a) shows the deformed shape of an isolator with R=2.5 and FIG. 3(b) shows the deformed shape of an isolator with R=4.0 at full rollover showing the portion of the width that remains in contact with the supports;

FIGS. 4(a) and 4(b) show the delayed loss of contact due to vertical deflection, $d_v$;

FIGS. 5(a) and 5(b) show, respectively, schematic profile views of (a) exemplary experimental isolator E1-2 (B=50%) and (b) exemplary experimental isolator E2-2, (B=33%) identifying bonded and unbonded regions of each;

FIGS. 10(a) and 10(b) show comparisons of FEA and experimental results (with 15% error bars) for, respectively, (a) E1-1 and (b) E2-1.

FIGS. 14(a) and 14(b) show the local stress $S_{33}$ contours for isolator E1 with, respectively, (a) B=0% and (b) B=$B_{max}$ at 2.00 $t_r$;

DETAILED DESCRIPTION

Figure 1A:
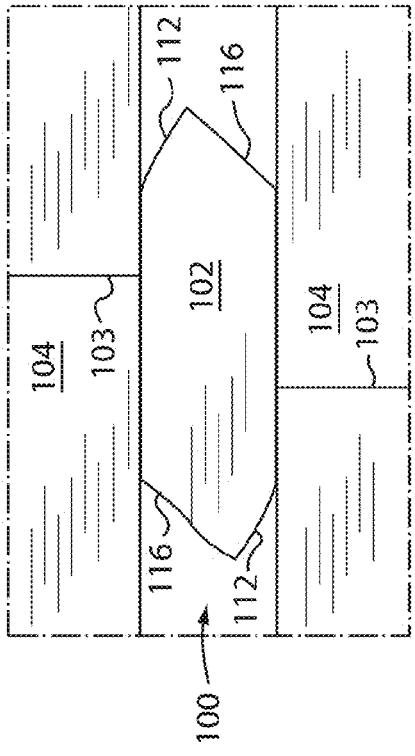
FIGS. 1(a) to 1(d) and FIGS. 1(e) to 1(h) show the behavior of a FREI bearing in unbonded application at different amplitudes of lateral displacement with FIGS. 1(a) to 1(d) showing displacement of the upper support to the right and FIGS. 1(e) to 1(h) showing displacement of the upper support to the left.
Figure 1B:
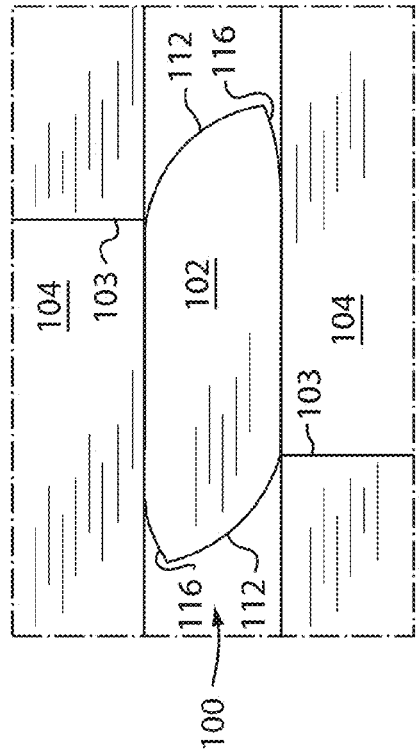
Figure 1C:
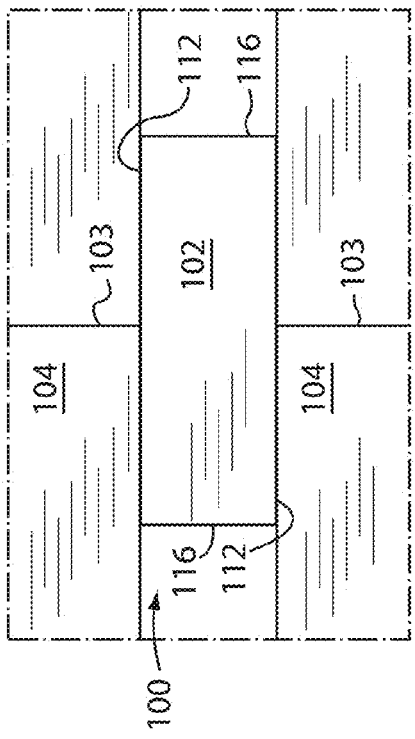
Figure 1D:
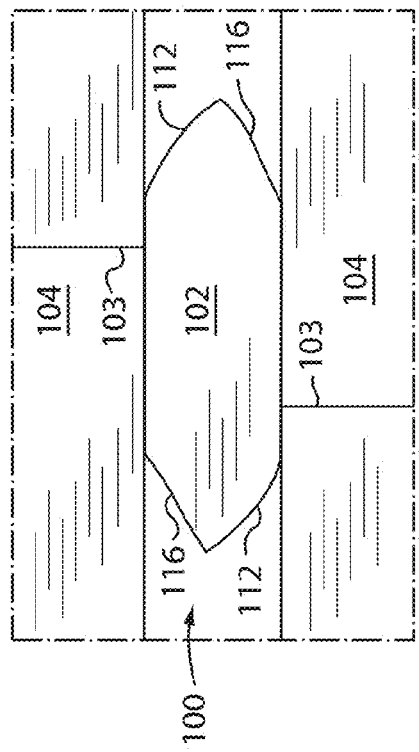
Figure 1E:
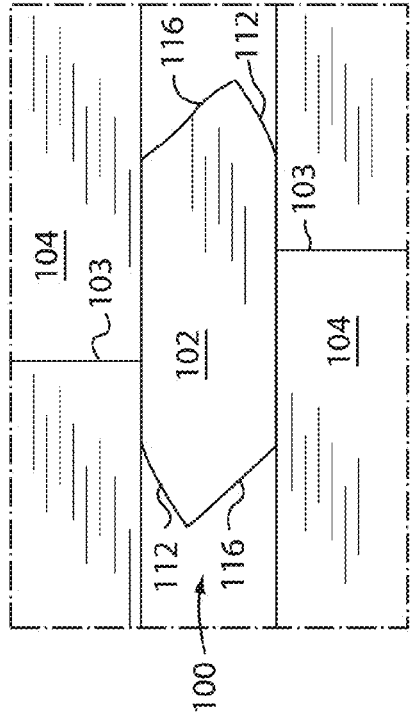
Figure 1F:
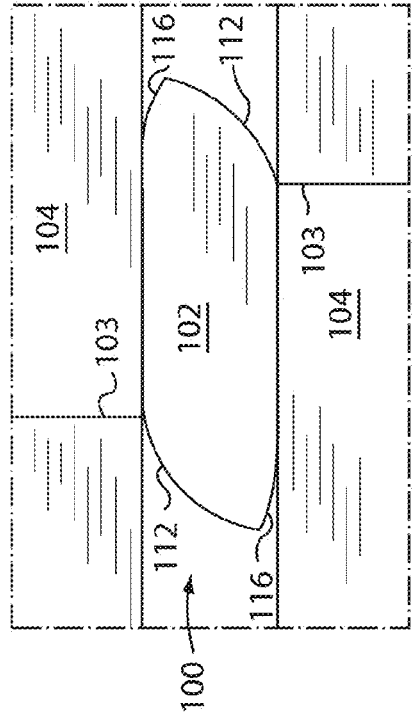
Figure 1G:
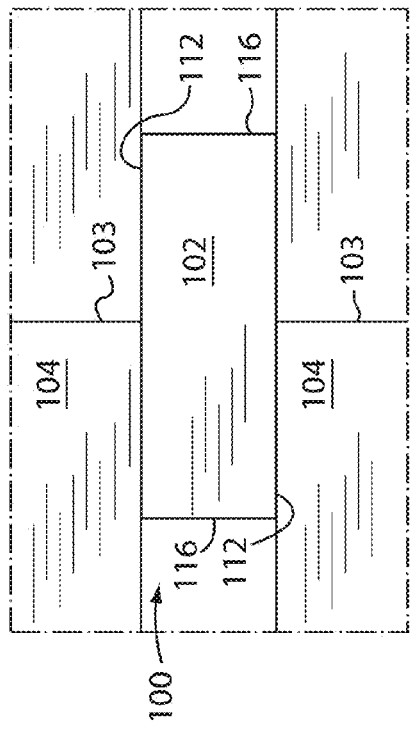
Figure 1H:
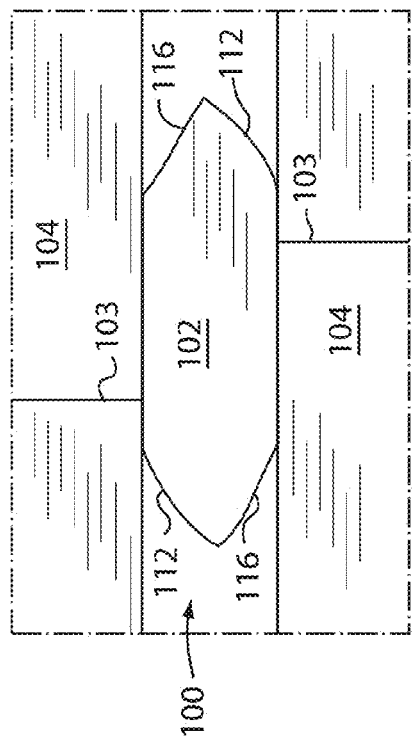

As described above, unbonded isolators are limited to situations where the minimum vertical design load is compressive. Partially bonding the isolator allows vertical tensile forces to be resisted. In general, the performance of FREIs in tension is a unique problem due to the load-dependent nature of the fiber reinforcements. As a tensile load is applied, due to the near incompressibility of the elastomer, the fiber reinforcement will be in compression. Fiber reinforcement is often assumed to provide no appreciable resistance in compression, although the performance of fiber reinforcement in compression as a composite with an elastomer, such as with FREIs, has not been investigated.

Partially Bonded Fiber Reinforced Elastomeric Isolators (PB-FREIs) require the reintroduction of rigid supports such as steel end plates, which can be mechanically fastened to the substructure and superstructure of the building, but addresses design limitations over the transfer of tensile forces and residual displacement due to slip at the interface between the isolator and the contact supports. The resulting isolator demonstrates advantageous characteristics as compared to both unbonded and bonded isolators. The present disclosure describes the concept of PB-FREIs, including an application of finite element analysis (FEA) and an experimental program that compares PB-FREIs and unbonded FREIs.

The limiting shear strain of an unbonded SREI with thin steel reinforcing plates was investigated by Kelly and Konstantinidis (2007). The limiting shear strain was defined as the strain at which full rollover occurs. Utilizing the principles of conservation of volume for the assumed incompressible elastomer, and by assuming that the length of the rollover section of the contact surface is equal to the horizontal displacement of the isolator, the limiting shear strain, $\gamma_c$, was determined as:

$$\gamma_c = \frac{5}{3}\frac{h}{t_r} \quad (1)$$

where h is the total height of the isolator. The "rollover section" of the contact surface is the section of the contact surface that, in the absence of any bonding, loses contact with the support during rollover deformation; thus, for an unbonded isolator the rollover section of the contact surface is the section of the unbonded contact surface that loses contact with the support during rollover.

The total bond extent, B, is expressed as a percentage of the total width of the isolator body, measured in the direction of horizontal displacement (the displacement axis of the isolator body) for rectangular (including square) designs, or as a percentage of the diameter for circular isolators. The bonding between the isolator body and the respective supports may take the form of a single continuous bond or a plurality of distinct bonds; the term "total bond extent" applies to both. Where there are a plurality of distinct bonds between the isolator body and one of the supports, the term "total bond extent" refers to the distance between the outer edges of the two outermost bonds to that support, measured along the displacement axis of the isolator body. Where there is only a single bond between the isolator body and a support, the term "total bond extent" refers to the length of the bond to that support, measured along the displacement axis of the isolator body.

In many applications, it is desirable to have the rollover sections of the isolator body unbonded (i.e. not bonded to the rigid supports) such that the rollover sections are not influenced by the presence of the bond and behave as they would in an unbonded FREI. To achieve this, from Equation (1), the bond must be located a distance of 5/3 h from the free edge of the isolator body. The maximum percentage of the isolator body that can be bonded without the bond entering the rollover region, $B_{max}$, can be expressed as:

$$B_{max} = \left(1 - \frac{10}{3R}\right) \times 100 \qquad (2)$$

where R is the aspect ratio. As noted above, the aspect ratio is defined as the ratio of the width (which will be the diameter for a circular isolator) in the direction of horizontal displacement (the displacement axis of the isolator body) to the total height of the isolator (measured along the free edges of the isolator body). By setting $B_{max}$ in Eq. (2) to zero, the minimum theoretical aspect ratio required such that a bonded portion can be introduced that does not enter the rollover section of the contact surface is R=10/3≈3.3. For isolators with aspect ratios R<3.3, Eq. (2) will be negative, implying that any level of bonding will enter the rollover section of the contact surface. Thus, for a PB-FREI to have bonding that does not enter the rollover section of the contact surface, the isolator body must have an aspect ratio (width over height) of at least about 3.3, where height is measured along the free edge(s) of the isolator body and width is measured along a displacement axis of the isolator body; a rectangular isolator body has two perpendicular widths and for a circular isolator body the width is the diameter. As noted above, the "rollover section" of the contact surface is the section of the contact surface that would, in the absence of any bonding, lose contact with the support during rollover deformation; it is understood that where bonding is present in this section, such loss of contact will be inhibited. Where the isolator bond has an aspect ratio of at least about 3.3, for the bonding to be outside the rollover section of the contact surface at a given free edge of the isolator body, the outermost bond with respect to that free edge should be a distance of at least about 5/3 h from the free edge, where h is a height of the isolator body as measured along the at least one free edge of the isolator body. Taking into account the area occupied by the bond(s), the width of the isolator body, measured along a displacement axis of the isolator body, is at least about (10/3 h+$B_L$) where $B_L$ is the largest total bond extent and each outermost bond is located a distance of at least about 5/3 h from each free edge of the isolator body. Since the total bond extent may be different for the upper and lower supports, the largest total bond extent $B_L$ defines the width of the isolator body.

Figure 2:
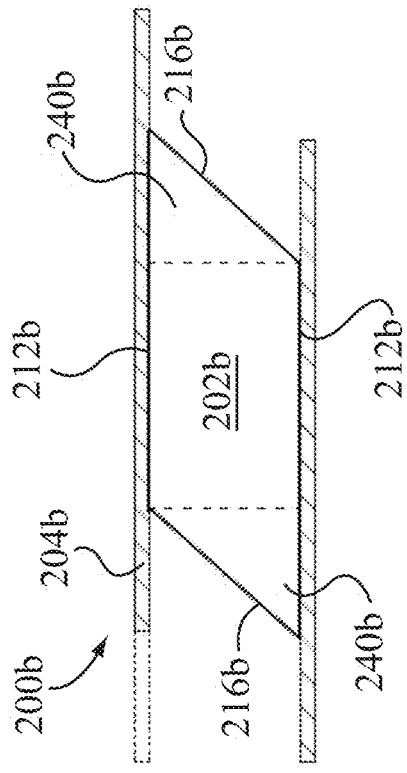
FIG. 2(a) shows the deformed shape of an unbonded FREI and FIG. 2(b) shows the deformed shape of a bonded isolator.
Figure 2:
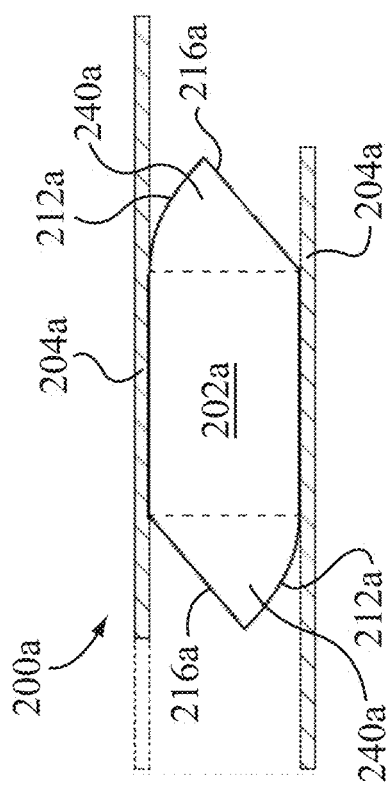

A comparison of an unbonded isolator body 302a of aspect ratio R=2.5, where the entire width loses contact at full rollover, and an unbonded isolator body 302b of aspect ratio R=4.0 demonstrating $B_{max}$, is shown in FIGS. 3(a) and 3(b), in which corresponding reference numerals are used for features corresponding to features of the unbonded isolator body 202a in FIG. 2(a) except with the prefix "3" instead of "1" and the suffix "a" or "b", respectively. In FIGS. 3(a) and 3(b), the isolator bodies 302a, 302b are shown in solid lines in undeformed condition and in dashed lines in full rollover. As can be seen, for the unbonded isolator body 302a of aspect ratio R=2.5, there is no part of the contact surface 312a that is in continuous contact with the support (not shown in FIGS. 3a and 3b) during the entire rollover cycle, i.e. when both displacement directions are considered). In contrast, for the unbonded isolator body 302b of aspect ratio R=4.0 there is a region 344 of length $B_{max}$ which is in contact with the support 304b during the entire rollover cycle; contact is lost in the region shown by reference 342. Russo et al. (2013) proposed an analytical model for unbonded FREIs that included the vertical deflection of the isolator. The model recognized that the vertical deflection $d_v$ would delay the loss of contact between the supports and the rollover section of the isolator as demonstrated in FIGS. 4(a) and 4(b). In FIGS. 4(a) and 4(b), corresponding reference numerals are used for features corresponding to features of the FREI 100 in FIGS. 1(a) to 1(h) except with the prefix "4" instead of "1". Consequently, it is anticipated that the bond could also be extended into the rollover section of the contact surface without influencing the rollover deformation and the estimate presented here is considered a lower bound.

Experimental Testing

Two isolator designs were considered in this study. Both designs were reinforced with plain weave bidirectional carbon fiber. The isolator bodies were manufactured in large pads and subsequently cut to the desired size. Four specimens, two of each isolator body design, were considered. Isolator bodies of design E1 have identical layer design to the isolator bodies consider in Foster (2011) and isolator bodies of design E2 have identical layer design to those considered in de Raaf (2009). E1 isolator bodies were cut to an aspect ratio of R=3.5 and E2 isolator bodies were cut to an aspect ratio of R=5.0; thus, both isolator bodies have an aspect ratio (width over height) greater than 3.3. FIGS. 5(a) and 5(b) show the isolator designs 500a, 500b considered with the bonds 514a, 514b identified; the vertical size (thickness) of the bonds 514a, 514b is exaggerated for illustrative purposes. Isolator body E1-1 was tested unbonded while isolator body E1-2, as shown in FIG. 5(a) and denoted by reference 502a, was bonded such that the bond 514a enters the rollover sections 520a of the opposed contact surfaces 512a at a horizontal displacement of 1.0 $t_r$ or B=50% ($B_{max}$=5%) Isolator body E2-1 was tested unbonded and isolator body E2-2, as shown in FIG. 5(b) and denoted by reference 502b, was bonded such that the bond 514b does not enter the rollover sections 520b of the opposed contact surfaces 512b, or B=$B_{max}$=33%. The total height, h, was 22.4 mm and 24.0 mm for E1 and E2 isolator bodies, respectively. All isolator bodies considered had a total thickness of elastomeric layers, $t_r$, of 19.1 mm and were bonded to rigid supports 504a, 504b in the form of steel plates using a cold vulcanizing agent.

Thus, FIGS. 5(a) and 5(b) show, respectively, a partially bonded fiber reinforced elastomeric isolator 500a, 500b comprising an isolator body 502a, 502b and a pair of opposed rigid supports 504a, 504b. The isolator body 502a, 502b has a laminate structure 506a, 506b comprising a plurality of distinct layers of elastomeric material 508a, 508b and a plurality of distinct layers of fiber reinforcement 510a, 510b. Two of the layers of elastomeric material 508a, 508b form external layers of the laminate structure 506a, 506b and define opposed contact surfaces 512a, 512b of the isolator body 502a, 502b. Free edges 516 of the isolator body 502 extend between the contact surfaces 512 about a periphery of the isolator body 502. In the experimental embodiment the elastomeric material was neoprene; other suitable elastomeric materials, such as natural rubber, may also be used. Carbon fiber was used for the fiber reinforcement in the experimental embodiment although other suitable materials, such as glass fiber or Kevlar® synthetic fiber, may also be used. In the experimental embodiment, the fiber reinforcement 510a, 510b was arranged as a plain weave bidirectional sheet; other suitable arrangements for the fiber reinforcement may also be used.

As can be seen in FIGS. 5(a) and 5(b), each layer of fiber reinforcement 510a, 510b is disposed between a pair of adjacent layers of elastomeric material 508a, 508b. Each pair of adjacent layers of elastomeric material 508a, 508b is bonded together across the layer of fiber reinforcement 510a, 510b disposed therebetween. The adjacent layers of elastomeric material 508a, 508b may be bonded together across the layer of fiber reinforcement 510a, 510b disposed therebetween in any manner which prevents separation or delamination of the laminate structure 506a, 506b under the stresses to which the isolator body 502a, 502b is subjected when in use. For example, in the experimental embodiments described herein each pair of adjacent layers of elastomeric material 508a, 508b is bonded together across the layer of fiber reinforcement 510a, 510b disposed therebetween by being bonded to opposed sides the layer of fiber reinforcement 510a, 510b disposed therebetween while being unbonded to each other. Other methods may also be used, such as by using porous layers of fiber reinforcement and bonding each pair of adjacent layers of elastomeric material together across the layer of fiber reinforcement disposed therebetween by bonding the layers of elastomeric material to each other through the porous fiber layer. In addition, the opposed contact surfaces 512a, 512b of the isolator body 502a, 502b are bonded to the respective opposed rigid supports 504a, 504b by respective bonds 514a, 514b so that the isolator body 502a, 502b is disposed between the opposed rigid supports 504a, 504b.

The isolators 500a, 500b are characterized in that the bonds 514a, 514b are disposed inwardly of the free edges 516a, 516b of the isolator bodies 502a, 502b. Although the isolator body 502a shown in FIG. 5(a) was bonded such that the bond 514a enters the rollover sections 520a of the opposed contact surfaces 512a, for the isolator body 502b shown in FIG. 5(b) the bonds 514b are disposed inwardly of the rollover 520b sections of the opposed contact surfaces 512b. More particularly, for the isolator body 502b shown in FIG. 5(b) the bonds 514b are located a distance of at least about 5/3 h from the free edge 516b of the isolator body 502b, where h is a height of the isolator body 502b as measured along the free edges 516b of the isolator body 502b. The width of the isolator body 502b, measured along the displacement axis of the isolator body 502b, (10/3 h+B) where B is a total bond extent, which in this case is the length of the bonds 514b; in this case the bonds 514b also each have a length of about 5/3 h (about 40 mm) so the total width of the isolator body 502b is 15 h or about 120 mm. The bonds 514b are located a distance of about 5/3 h (about 40 mm) from each free edge 5146b of the isolator body 502b.

Appropriate bonding techniques, both for bonding adjacent layers of elastomeric material together across the interposed layer of fiber reinforcement and for bonding the contact surfaces of the isolator body to the rigid supports, include hot vulcanization, cold vulcanization, and suitable adhesives, so long as they provide sufficient strength to withstand the forces to which the isolator will be subjected. Although a single continuous bond 514a, 514b between the opposed contact surfaces 512a, 512b and the respective opposed rigid supports 504a, 504b is shown for illustrative purposes, in alternative embodiments a plurality of distinct bonds may be used to bond the opposed contact surfaces to the respective opposed rigid supports, so long as the outermost bond is disposed inwardly of the free edge(s) of the isolator body and sufficient bonding strength is achieved.

The experimental apparatus was configured to conduct testing under vertical load control and horizontal displacement control. The horizontal load was measured directly with a single load cell and the horizontal displacement was measured with a string potentiometer. The vertical load was measured with three load cells and the vertical displacement was measured with four laser transducers. Each unbonded isolator was placed between two level steel plates, whereas the partially bonded isolators were mechanically fastened to the two level steel plates through the steel supports that are bonded to the isolator bodies.

Figure 6:
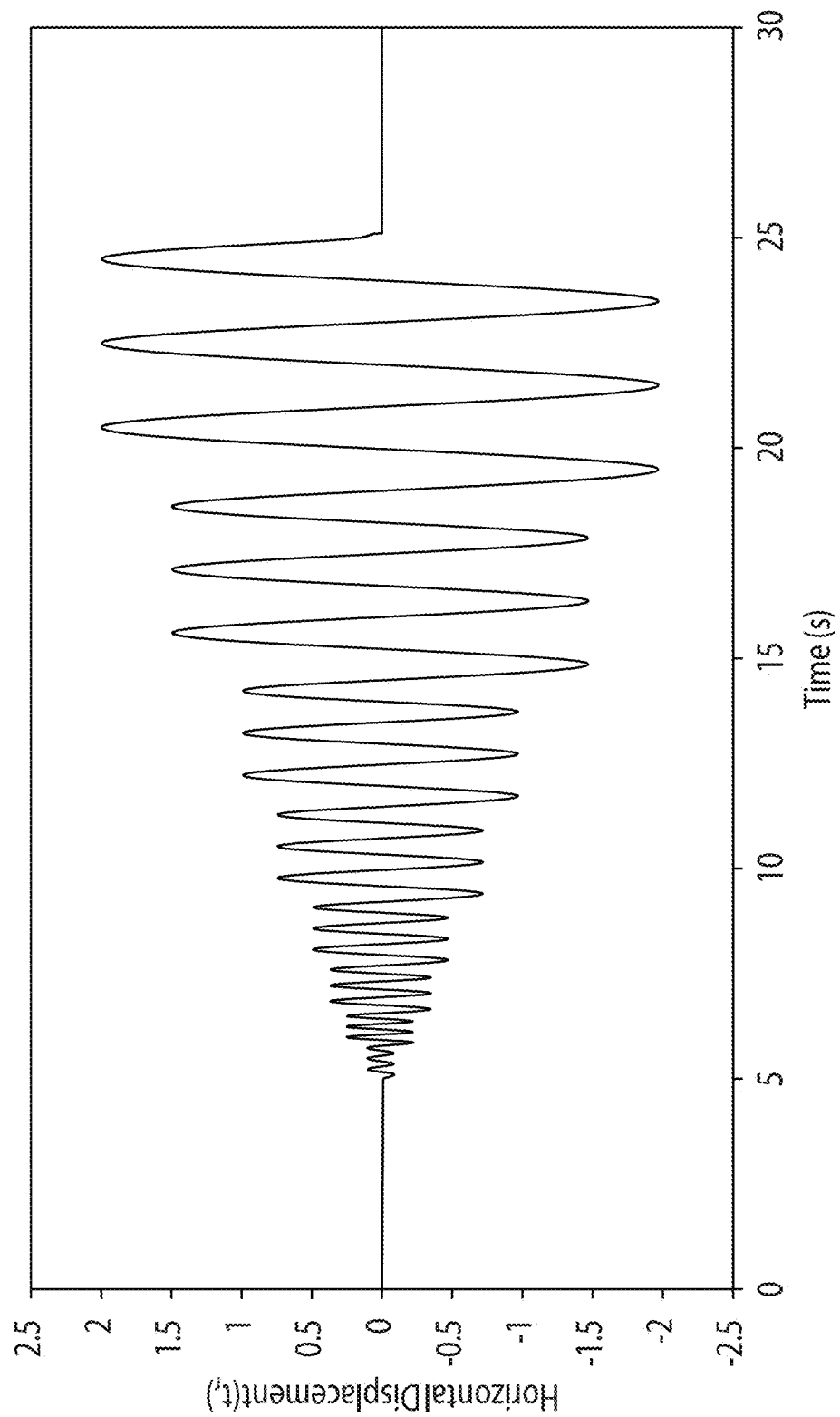
FIG. 6 shows the horizontal experimental displacement history.

Each isolator was tested under an average vertical stress of 2.0 MPa. FIG. 6 shows the horizontal test displacement history. Each isolator was subjected to three cycles at eight displacement amplitudes. The first cycle, 0.10 $t_r$, was conducted at a constant rate of 30 mm/s and the remaining cycles, ranging from 0.25 $t_r$ to 2.00 $t_r$, were conducted at a constant rate of 76.2 mm/s. Each isolator was monotonically loaded to the design stress before beginning the cycles and monotonically unloaded after the cycles were complete.

The table below presents the ratio of the respective bonded values to the unbonded values for the effective horizontal stiffness, $k_{eff}$, and equivalent viscous damping, $\zeta$, for displacement amplitudes from 0.25 $t_r$ to 2.00 $t_r$.

TABLE 1

Comparison of ratio of partially bonded to unbonded experimental results

| Displacement | $k_{eff}$ | | $\zeta$ | |
|---|---|---|---|---|
| ($t_r$) | E1-2/E1-1 | E2-2/E2-1 | E1-2/E1-1 | E2-2/E2-1 |
| 0.25 | 1.05 | 0.94 | 0.99 | 1.02 |
| 0.50 | 1.20 | 0.96 | 0.82 | 1.08 |
| 0.75 | 1.10 | 0.95 | 0.99 | 1.02 |
| 1.00 | 1.06 | 0.95 | 0.97 | 1.01 |
| 1.50 | 1.04 | 0.96 | 0.95 | 1.00 |
| 2.00 | 1.01 | 0.97 | 0.94 | 0.95 |

For E1 isolators, in all instances isolator E1-2 (the partially bonded E1 isolator) had a larger effective horizontal stiffness than isolator E1-1 with the largest ratio of 1.20 occurring at 0.50 $t_r$. It can be seen that as the displacement amplitude increases that the ratio of E1-2 to E1-1 decreases and approaches unity. The ratio for E2-2 to E2-1 remained relatively constant with minor fluctuations from the average of 0.96. The ratio of equivalent viscous damping for E1-2 to E1-1 is, with the exception of 0.50 $t_r$, approximately unity. The minimum ratio was 0.82, suggesting a decrease due to the partial bond, however, this may be in part due to the effective horizontal stiffness ratio of 1.20 observed at that displacement amplitude. Similar to the effective horizontal stiffness, the equivalent viscous damping ratio for E2-2 to E2-1 is close to unity at all displacement amplitudes considered with the largest ratio of 1.08 occurring at 0.50 $t_r$.

Figure 7A:
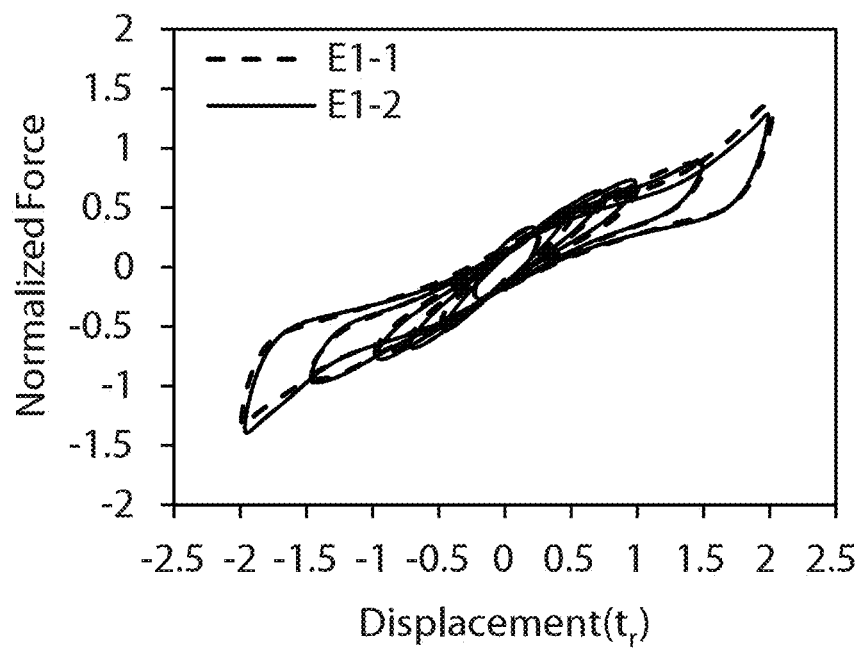
FIGS. 7(a) and 7(b) show, respectively, the normalized experimental force-displacement hysteresis for (a) isolator E1-1 and E1-2, and (b) isolator E2-1 and E2-2.
Figure 7B:
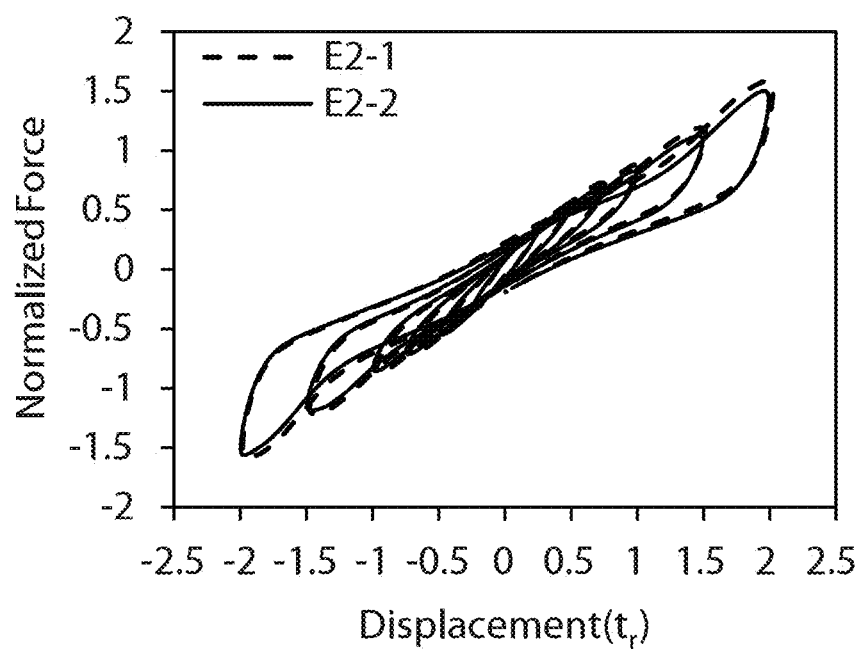

FIGS. 7(a) and 7(b) show the normalized hysteresis for the partially bonded and unbonded isolators for both designs considered. All isolators displayed the characteristic softening and stiffening associated with stable rollover of unbonded FREIs. The softening and stiffening is less significant for E2 isolators due to the larger aspect ratio, which mitigates the effect of the rollover. It can be seen in FIG. 7(a) that, although the bond enters the rollover section at 1.00 $t_r$ for isolator E1-2, no appreciable change in the shape of the loop occurs; both the area contained within the loops and peak responses remains consistent with isolator E1-1. Similarly, FIG. 7(b) shows that the response of isolator E2-2 is almost indistinguishable from that of isolator E2-1.

Figure 8:
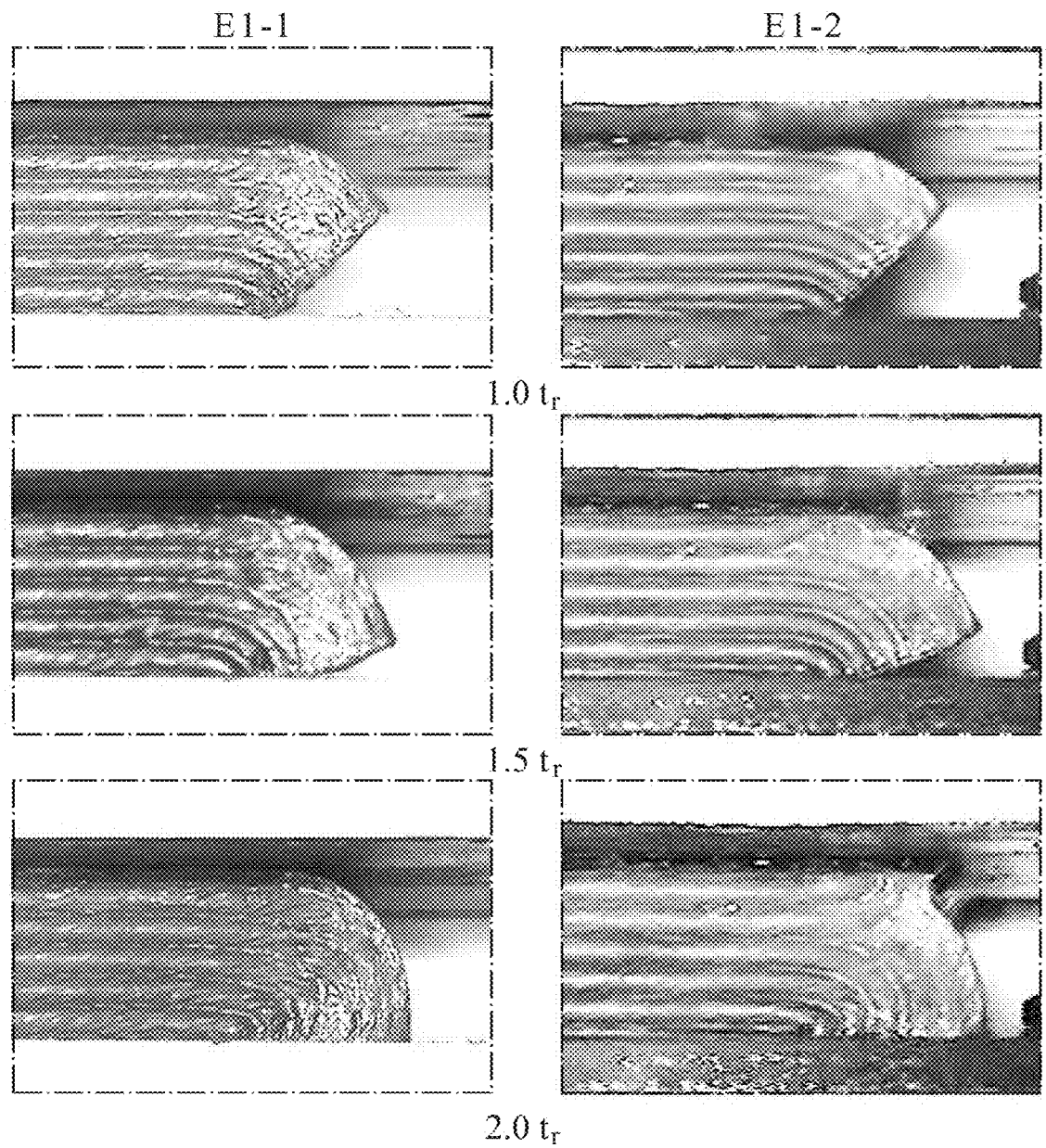
FIG. 8 is a photographic comparison of the deformed shape of the rollover of E1-1 and E1-2.

Although no significant deviation in the hysteretic response of the isolator was noted, the deformed shape of the isolator adjacent the bonded portion of the rollover section of the contact surface can be seen to be altered by the bond as shown in FIG. 8 which compares the deformed shape of E1-1 and E1-2. Prior to 1.00 $t_r$, the bond has not entered the rollover section and the deformed shape of the rollover section between isolator E1-1 and E1-2 is comparable. As the displacement increases to 1.50 $t_r$, only a minor difference in deformed shape is noted. Although the bond is now in the rollover section of the contact surface, the vertical deflection of the isolator body delays the loss of contact between the isolator body and the supports. As a consequence, although the bond is in the rollover section of the contact surface, the influence is minimized. At a displacement of 2.00 $t_r$, the bonded portion is visible and results in localized deformations representative of the tensile stresses introduced in this portion by the bond. Despite the localized deformation, based on the experimental results, the global impact on the performance of the isolator has been shown to be negligible. Isolator E1-2 was visually inspected after the test program, the integrity of the bond between the layers of elastomer and fiber reinforcement and the elastomer and the steel was not compromised. No delamination or other forms of damage were visually observed.

Figure 9:
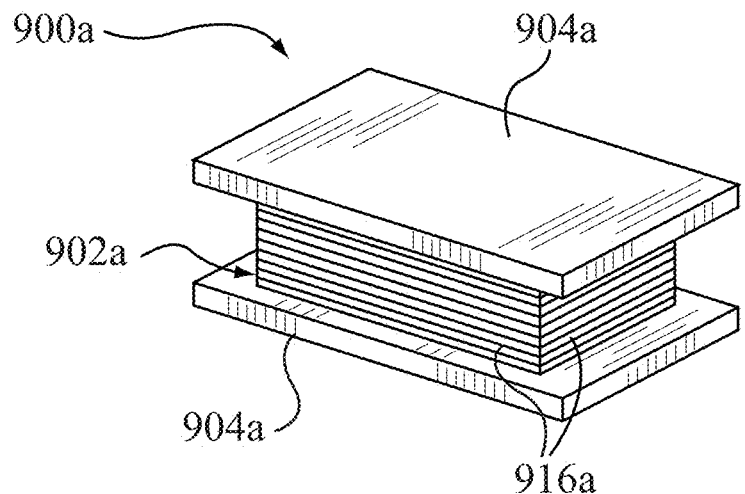
FIG. 9(a) shows a perspective view of an exemplary partially bonded isolator whose isolator body and supports are rectangular.
FIG. 9(b) shows a perspective view of an exemplary partially bonded isolator whose isolator body and supports are circular.
Figure 9:
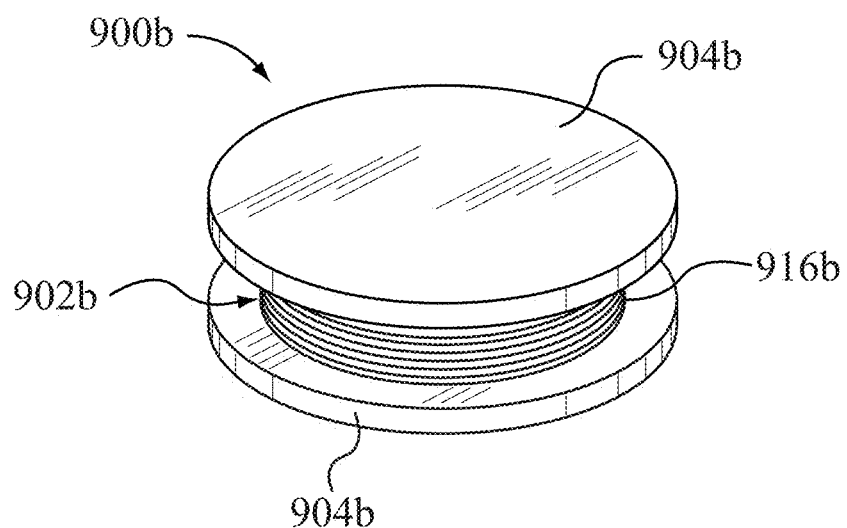

The experimental partially bonded isolators 500a, 500b illustrated in FIGS. 5(a) and 5(b) have isolator bodies 502a, 502b that are rectangular in shape. FIG. 9(a) shows a perspective view of an exemplary partially bonded isolator 900a whose isolator body 902a and supports 904a are rectangular and hence the isolator body 902a has four free edges 916a forming a rectangle. Partially bonded isolators need not have rectangular isolator bodies, and FIG. 9(b) shows a perspective view of an exemplary partially bonded isolator 900b whose isolator body 902b and supports 904b are circular and thus the isolator body 902b has a single free edge 916b forming a circle. In FIGS. 9(a) and 9(b), corresponding reference numerals are used for features corresponding to features of the partially bonded isolators 500a, 500b illustrated in FIGS. 5(a) and 5(b) except with the prefix "9" instead of "5". Isolator bodies of partially bonded isolators may have other suitable shapes besides rectangular and circular, and the supports need not have the same shape as the isolator body.

Finite Element Analysis

In this study, the finite element analysis (FEA) was conducted using MSC Marc (2011), a commercially available finite element software package. A three dimensional analysis was performed using an updated Lagrangian framework. In this framework, the reference configuration is updated and the discrete equations are formulated in the current configuration. Eight-node hexahedron isoparamteric elements were used to model the elastomeric layers. The fiber reinforcement layers were modeled using four-node quadrilateral membrane elements with no flexural rigidity. The nonlinear behaviour of the elastomeric materials was modeled using a hyperelastic material model. Unlike linear elastic materials where the stress-strain relationship is derived using a constant factor, in the hyperelastic materials the stress-strain relationship is derived from a strain energy density function. In this study, the hyperelastic material law used for the rubber materials is Neo-Hookean, with the following strain energy density function:

$$W = C_{10}(\bar{I}_1 - 3) + \frac{K}{2}(J_3 - 1)^2 \quad (3)$$

where $C_{10}$ is the coefficient of the Neo-Hookean material model, K is the bulk modulus of the elastomeric material, $\bar{I}_1$ is the first deviatoric strain invariant and $J_3$ is the total volume ratio. The coefficient of the Neo-Hookean material model is related to the shear modulus, G, of the elastomeric material by $C_{10}=G/2$. The first deviatoric strain invariant is expressed as:

$$\bar{I}_1 = \bar{\lambda}_1^2 + \bar{\lambda}_2^2 + \bar{\lambda}_3^2 \quad (4)$$

where $\bar{\lambda}_1$ is the deviatoric stretches and is given by $$\bar{\lambda}_i J_3 - 1/3 \lambda_i \quad (5)$$

and $\lambda_i$ is the principal stretches with $J_3 = \lambda_1 \lambda_2 \lambda_3$.

In the FEA conducted, the isolator bodies were assumed to be a strip with infinite length. Thus, the actual length of the isolator bodies was not considered in the analysis and the isolator bodies were modeled with a unit length and restrained from lateral deformation perpendicular to the plane of the isolator body in the direction of loading. A specific contact was defined between the isolator bodies and the surfaces of the supports to allow the unbonded portions of the isolator bodies to detach from the supports as the compressive contact stress approaches zero. The contact between the bonded regions of the isolator bodies and the supports was defined such that no detachment was allowed.

FIGS. 10(a) and 10(b) show the normalized experimental results for, respectively, (a) E1-1 and (b) E2-1 isolators compared to the FEA results of the respective isolator with B=0%. It can be seen that in both cases the FEA prediction is in good agreement with experimental results for displacements exceeding 0.50 $t_r$ and 0.75 $t_r$ for E1-1 and E2-1, respectively. The FEA prediction is lower than the experimental results for low displacement amplitudes; without being limited by theory, this is primarily attributed to the assumed constant value of G, which ignores the strain dependency of the elastomeric layers. According to Equation (1), full rollover occurs at 1.96 $t_r$ and 2.10 $t_r$ for isolators E1-1 and E2-1, respectively. Therefore, it is expected that isolator E1-1 will display substantial stiffening as a result of the rollover before isolator E2-1, which is observed in FIG. 10(a) before 2.00 $t_r$. This is in reasonable agreement with the full rollover prediction from Equation (1). Therefore the FEA model was considered to perform satisfactorily in comparison to the experimental results and deemed appropriate for analysis.

Figure 11:
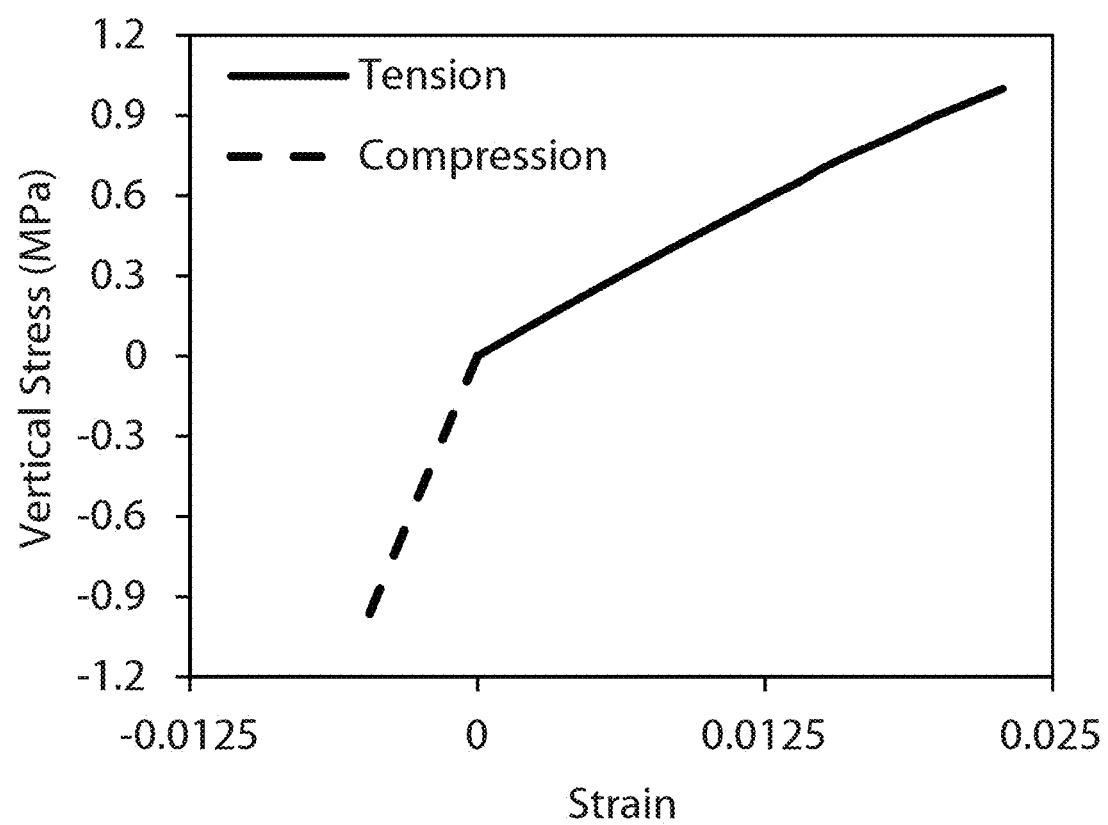
FIG. 11 shows the vertical stress strain relationship from FEA under tension and compression.
Figure 12:
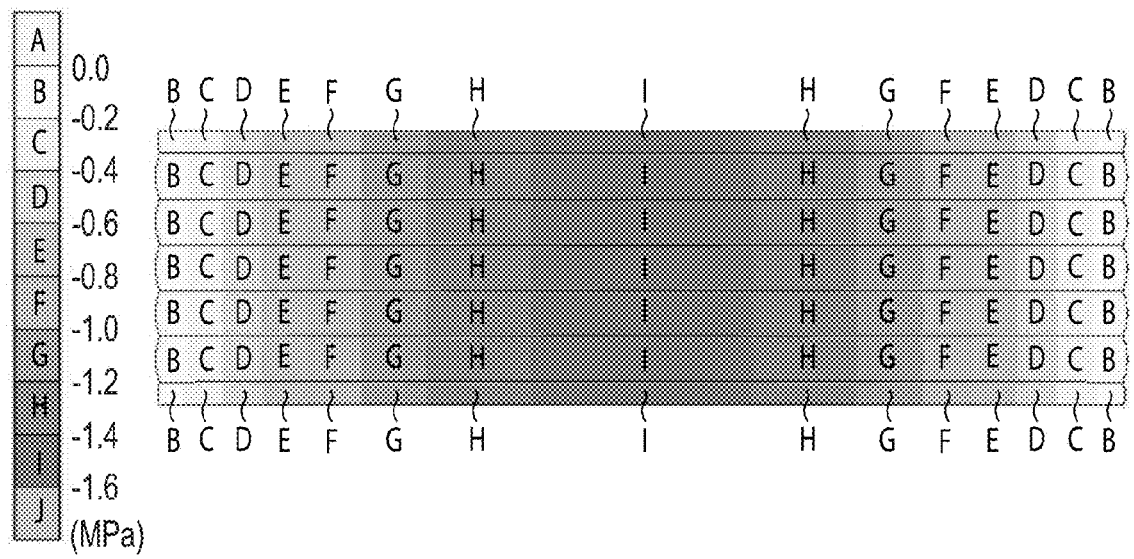
FIGS. 12(a) and 12(b) show the local stress $S_{33}$ contours for isolator E1 with B=50% under 1.0 MPa for, respectively, (a) compressive and (b) tensile stress.
Figure 12:
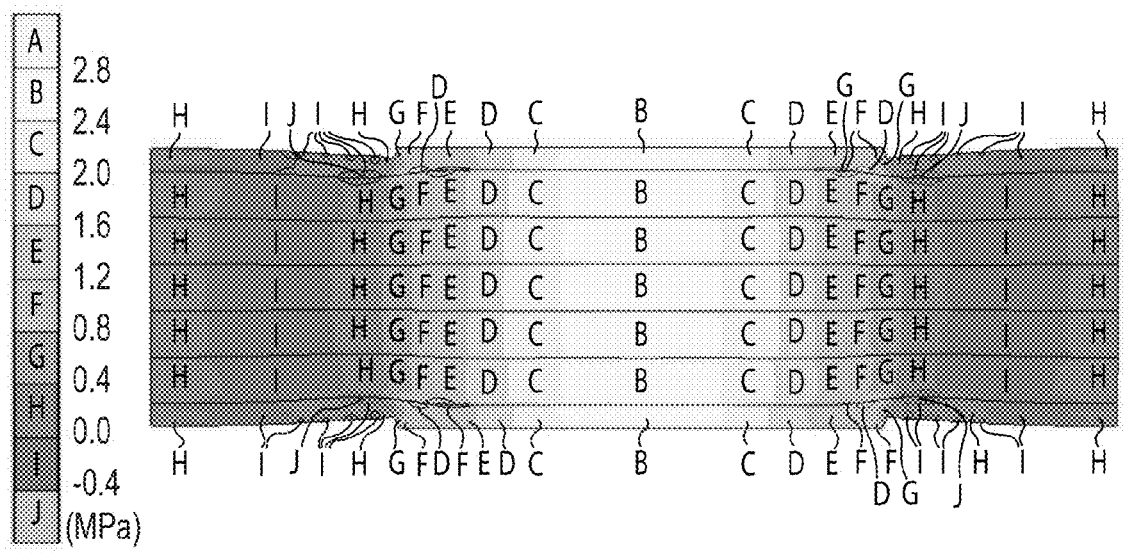

Isolator body E1 with B=50% was investigated through FEA under a 1.0 MPa compressive and tensile average vertical stress. The linear stress strain relationship obtained from the analysis is shown in FIG. 11. The vertical tensile modulus was determined to be 39.4 MPa, which is significantly lower than the compression modulus of 208 MPa. FIGS. 12(a) and 12(b) show the local $S_{33}$ stress contours for both cases considered: compressive stress (FIG. 12(a)) and tensile stress (FIG. 12(b)). It can be seen that in the compression case shown in FIG. 12(a) that the magnitude of the stress increases at a decreasing rate approaching the centre of the isolator body from the edge. Despite the 50% total bond extent, the entire isolator body remains effective in resisting the vertical compression. As friction develops between the unbonded sections of the contact surface the isolator body and the supports, slip is prevented and increases the confinement effect of the reinforcement.

In the tensile load case shown in FIG. 12(b), it can be seen that only the bonded portion (the portion of the isolator body that is vertically aligned with the bonded section of the contact surface) is largely effective in resisting the load while the unbonded portions (the portions of the isolator body that are vertically aligned with the bonded section of the contact surface) exhibit minor tensile and compressive stresses. It can be seen that these unbonded portions have a unique deformed shape as the unbonded portions are not in contact with the supports. The result is a reduced effective isolator width, which is a function of the total bond extent (at least where the bonds on both contact surfaces are of equal extent and in vertical registration with one another). As a consequence of the reduced width of the effective isolator, the magnitude of the stresses observed is greater than that of the compression case, which distributes the stresses over the entire width of the isolator.

Figure 13B:
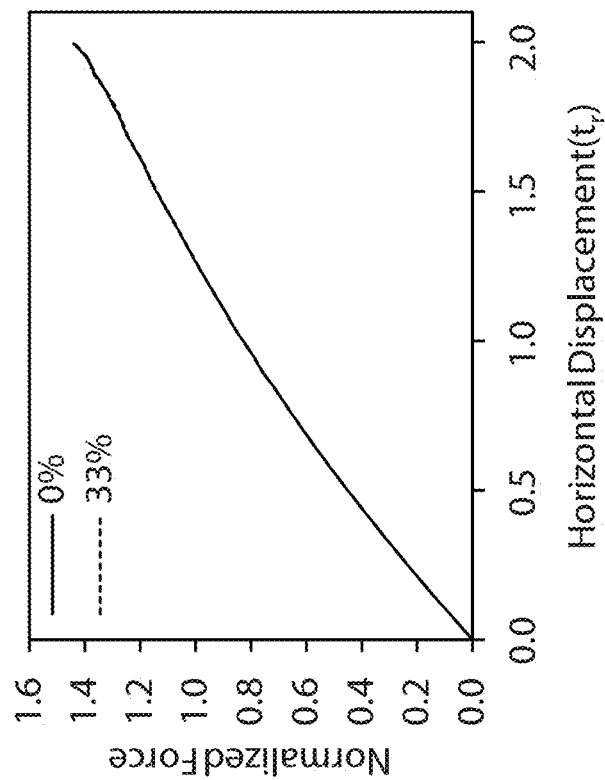
FIGS. 13(a) and 13(b) show comparisons of B=0% and B=$B_{max}$ results for, respectively, (a) E1 and (b) E2, showing negligible difference between the bonded and unbonded case.
Figure 13A:
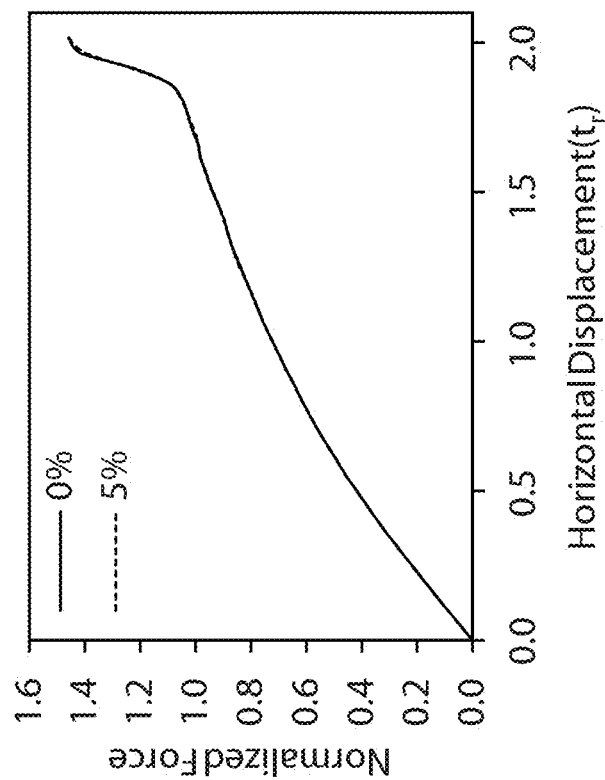

The FEA force-displacement relationship with a maximum considered displacement of 2.00 $t_r$ for B=0% and B=$B_{max}$ is shown in FIGS. 13(a) and 13(b) for isolator body E1 and isolator body E2, respectively. As anticipated, it can be seen that for both isolator body E1 and isolator body E2 the force-displacement relationship for B=0% and B=$B_{max}$ are indistinguishable from each other at all levels of displacement considered. The deformed shape at 2.00 $t_r$ is shown in FIGS. 14(a) and 14(b) for isolator body E1 and comparing the unbonded, B=0% (FIG. 14(a)), and bonded, B=$B_{max}$, (FIG. 14(b)), cases. It can be seen that for both cases, as with the experimental results, the deformed shape was also largely indistinguishable between the two cases. Furthermore, the stress contours of the local stresses $S_{33}$, which are initially in the vertical direction, are shown. It can be seen that the bonded section of the contact surface does not introduce any stress concentrations nor is any substantial alteration in the contours noted. It can be seen that the central portion of the isolator body that remains in contact is dominated by a compressive stress, whereas the rollover portions display a low tensile stress. (FIG. 17 and the related description explains shows schematically the division of an idealized PB-FREI isolator body into a "central portion" and "rollover portions".) Based on these observations is it postulated that, at least where the bonds on both contact surfaces are of equal extent and in vertical registration with one another, for any total bond extent B, where 0%<B<$B_{max}$, the total bond extent will have negligible influence on the horizontal force-displacement relationship under vertical compressive stress.

Figure 15:
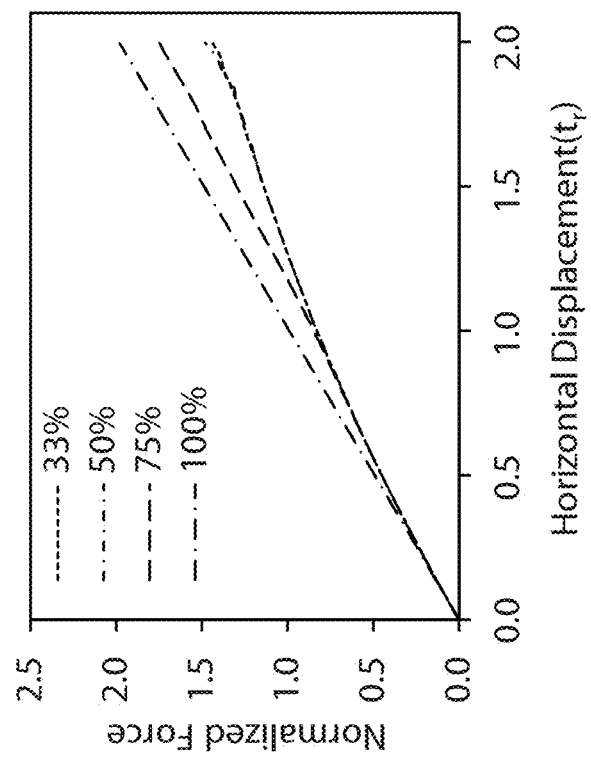
FIGS. 15(a) and 15(b) show the force-displacement relationship with B>$B_{max}$ for, respectively, (a) E1 isolators and (b) E2 isolators.
Figure 15:
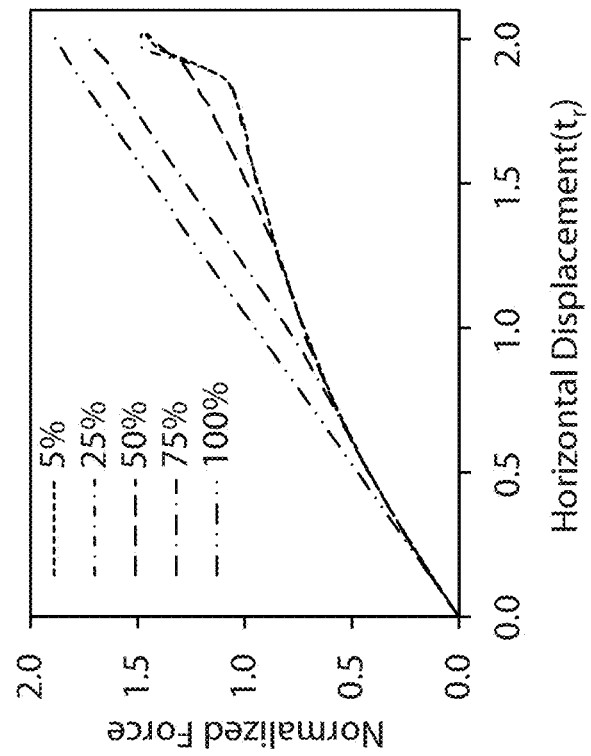
Figure 16:
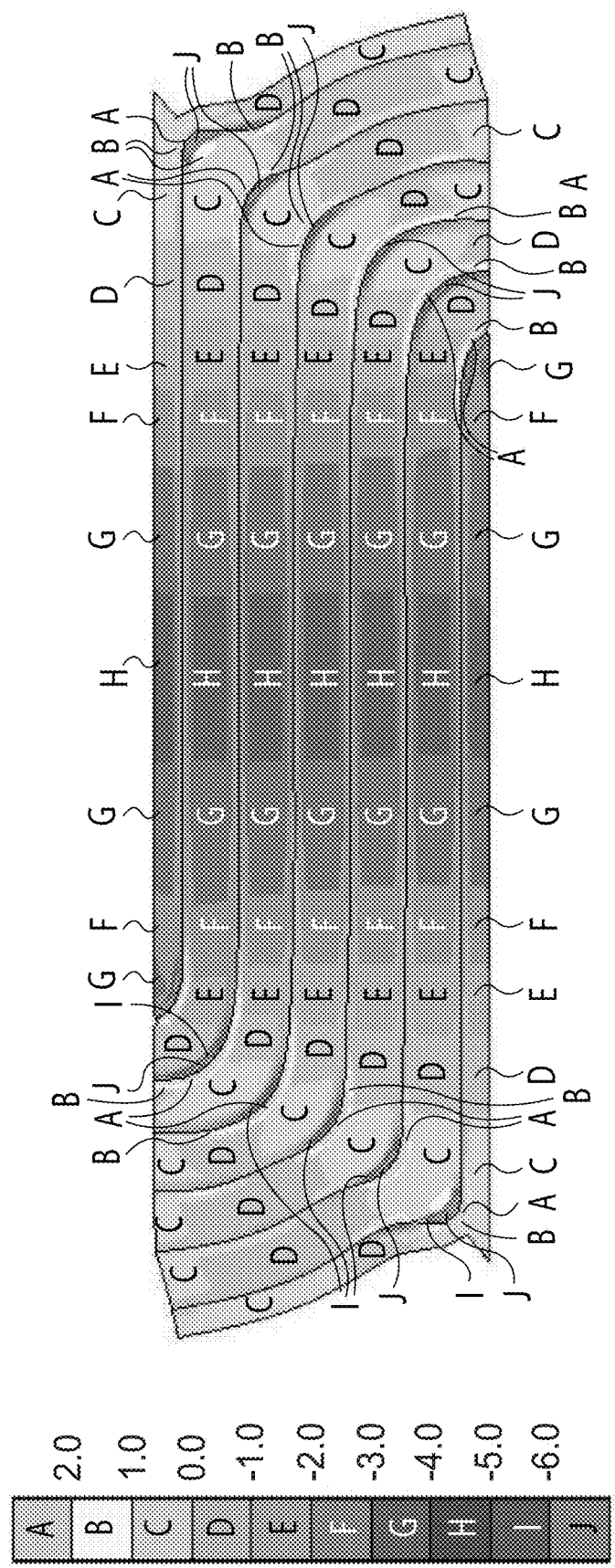
FIG. 16 shows the local stress $S_{33}$ of isolator E1 with B=50% at 2.00 $t_r$.

At least where the bonds on both contact surfaces are of equal extent and in vertical registration with one another, of total bond extent for B>$B_{max}$ is considered in increments of 25% from $B_{max}$ to a fully bonded FREI with B=25%, 50%, 75% and 100%. The FEA force-displacement relationships are shown in FIGS. 15(a) and 15(b). It can be seen that for E1, similar to the B=0% and B=$B_{max}$=5% case, that there exists negligible difference between B=5% and B=25%. As B is increased to 50%, it can be seen that an increase in the horizontal force is observed at approximately 1.25 $t_r$. This slight increase is observed until full rollover occurs at approximately 2.00 $t_r$ where the cases of B=5%, 25% and 50% once again become indistinguishable. In the experimental program no appreciable difference was noted in the hysteresis between isolator body E1-1 and isolator body E1-2. Although the FEA indicates a change in the force-displacement relationship of the isolator, the magnitude of the change was small at a maximum of 15% and only observed over a select range of the horizontal displacement. The deformed shape of B=50% at 2.00 $t_r$ is shown in FIG. 16 where, similar to the experimental results, localized deformations in the isolator body near the bonded region of the rollover section can be seen. This localized deformation is associated with the minor increase in horizontal force observed in the 1.25 $t_r$ to 2.00 $t_r$ range. The rollover section is otherwise relatively uninfluenced by the bond, and the rollover portion completes full rollover, although delayed due to the bond. As a consequence of the bond, an increase in tensile stress is observed in the part of the rollover portion where the contact surface is bonded to the support. The central portion also experiences an increase in compressive stress to accommodate the introduction of tensile stresses rollover portion.

Figure 17:
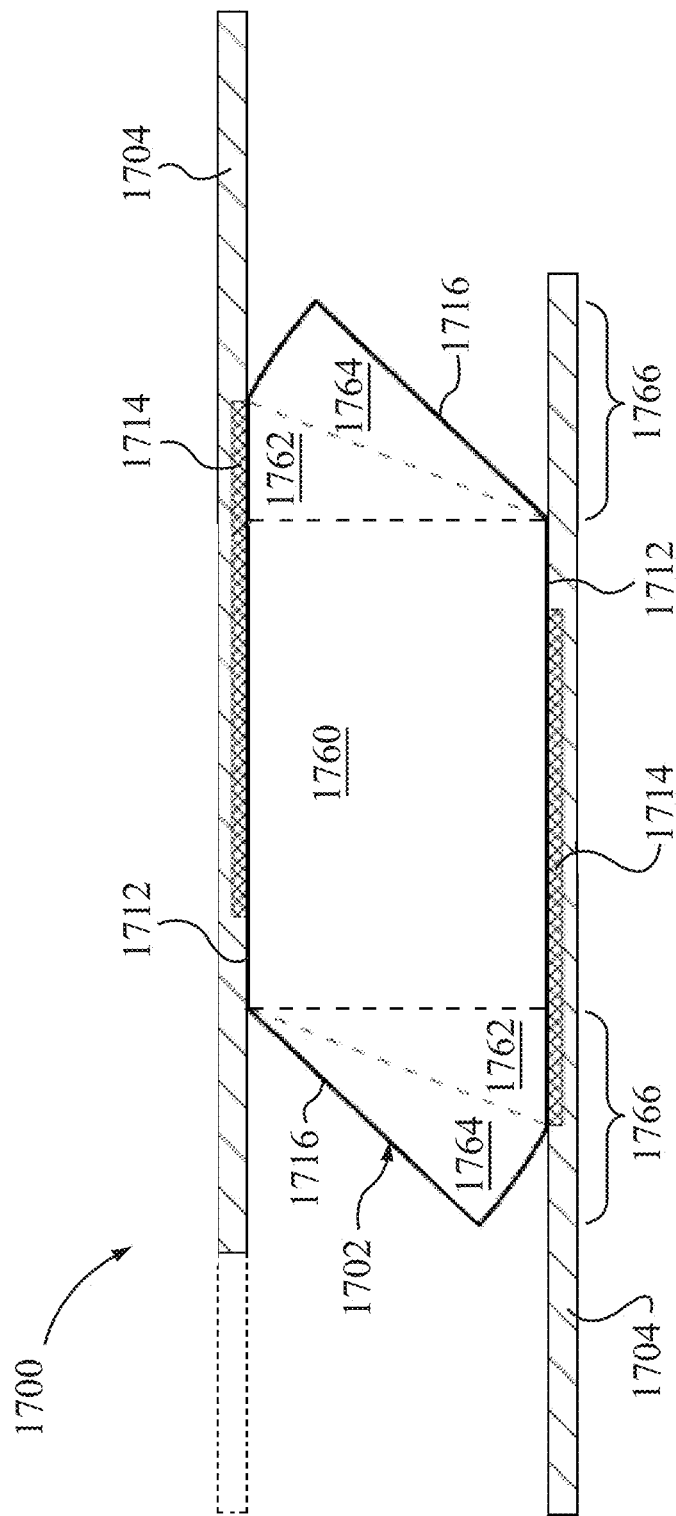
FIG. 17 shows the division of an idealized PB-FREI into three portions.

Reference is now made to FIG. 17, which shows an idealized PB-FREI 1700. In FIG. 17, corresponding reference numerals are used for features corresponding to features of the partially bonded isolators 500a, 500b illustrated in FIGS. 5(a) and 5(b) except with the prefix "17" instead of "5" and without suffixes. Three distinct portions of the isolator body 1702 are now observed: the "central portion" 1760, dominated by compressive stresses; the "bonded rollover portions" 1762, which are a consequence of the bonded regions of the contact surfaces 1712 and are dominated by tensile stresses; and the "conventional rollover portions" 1764, which are restrained by the bonded rollover portions 1762. The rollover portions 1766 of the isolator body 1702 comprise the bonded rollover portions 1762 and the conventional rollover portions 1764. The terms "central portion", "bonded rollover portion" and "conventional rollover portion", as described above with reference to FIG. 17, are used in describing the FEA models and stress contour plots shown in the Figures.

Figure 18:
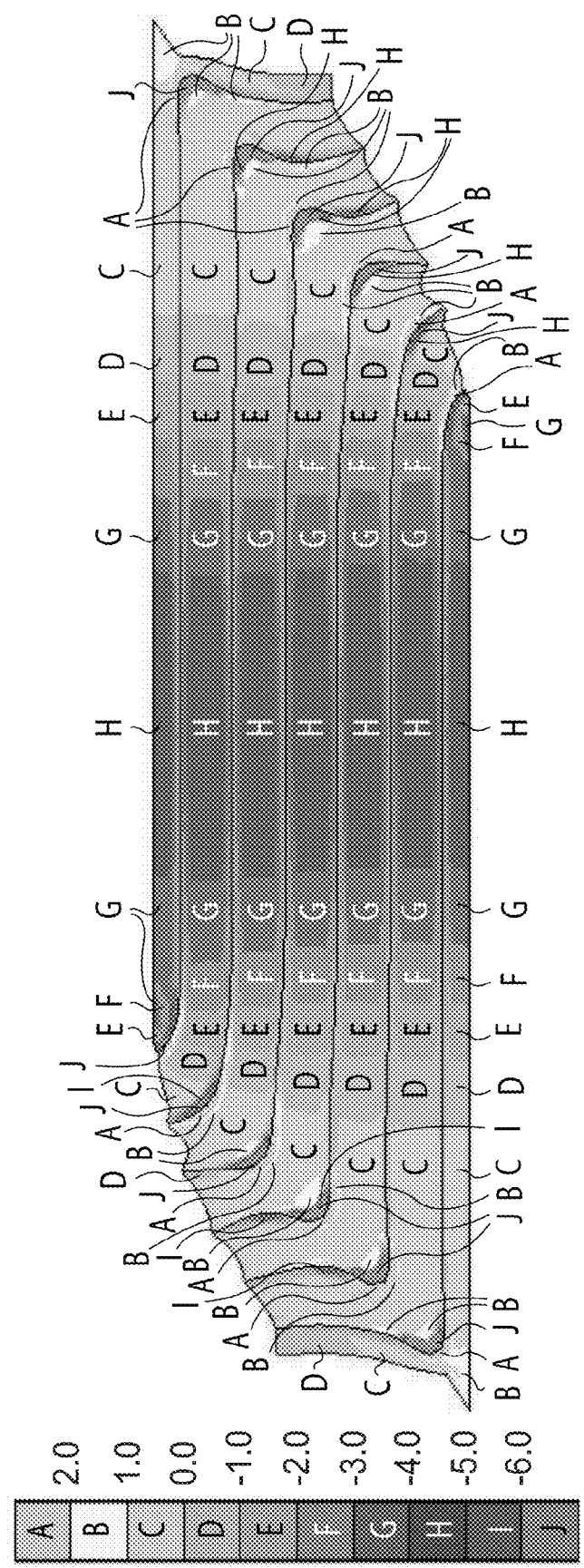
FIG. 18 shows the local stress $S_{33}$ of isolator E1 with B=75% at 2.00 $t_r$.

As the bond was increased to B=75% it can be seen in FIGS. 15(a) and (b) that further softening was prevented at approximately 0.75 $t_r$. While the extent of the unbonded region of the rollover section was approximately 0.50 $t_r$, the influence of the bond was not observed until 0.75 $t_r$. This is once again, without being limited by theory, attributed to the vertical deflection of the isolator body as described above. As the horizontal displacement increased, the size of the conventional rollover portion remained constant as additional rollover was restricted. As a consequence, the force-displacement relationship of the isolator body becomes similar to that of a bonded isolator with a width equal to the total bond extent. Due to the increase in total bond extent, the size of the bonded rollover portion was increased at the expense of the conventional rollover portion as illustrated in FIG. 18 at a displacement of 2.00 $t_r$. The additional tensile stress was accommodated by an additional increase in compressive stress in the central portion. In lieu of bulging outwards, the elastomeric layers bulged inwards and a large amount of deformation was noted in the fiber reinforcement and elastomer at the interface of the conventional rollover portion and the bonded rollover portion. At this level of bonding, full rollover and contact between the free edge (initially vertical face) of the isolator body and the supports was entirely prevented. Therefore, in this case, the stiffening observed is attributed to the bond and not to the occurrence of full rollover. The ratio of the horizontal force of B=75% in comparison to a fully bonded isolator, B=100%, at 2.00 $t_r$ was 91%. Since the ratio is larger than the total bond extent of B=75%, this suggests that the rollover portions still contribute a significant horizontal force resistance capacity and that the horizontal force-displacement relationship of the isolator is not entirely dominated by the bonds.

Figure 19:
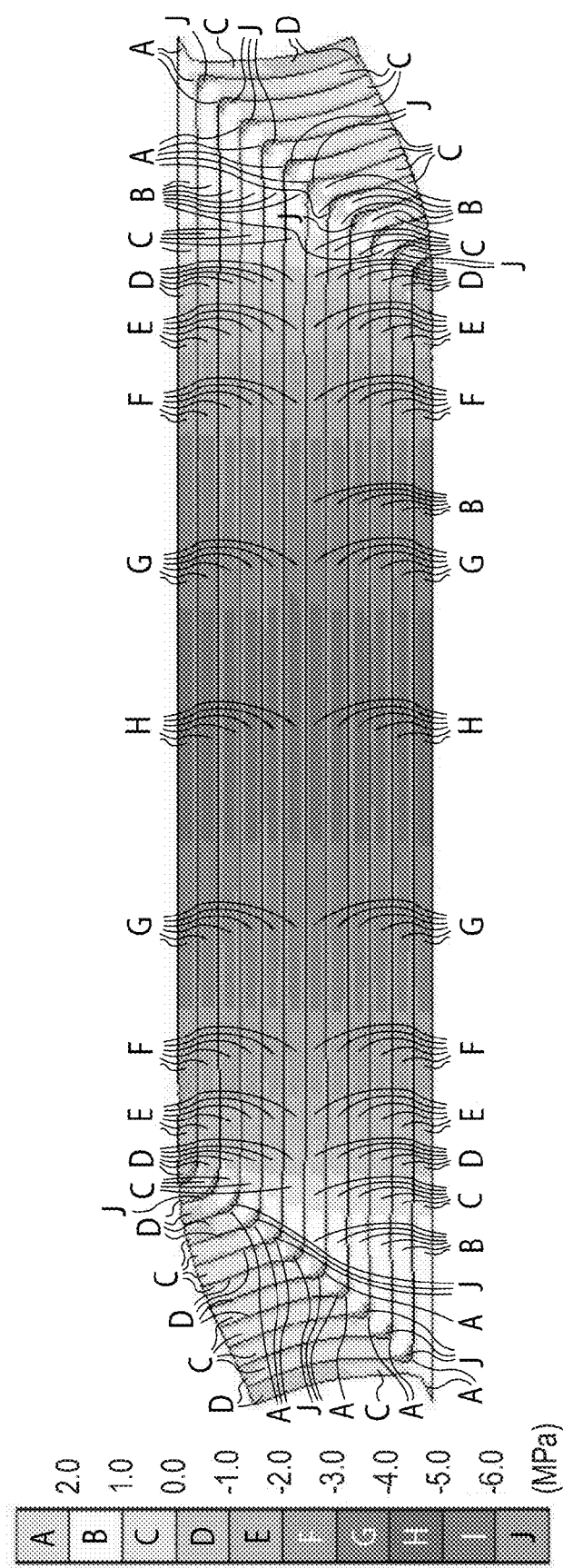
FIG. 19 shows the local stress $S_{33}$ of isolator E2 with B=75% at 2.00 $t_r$.

Similar to E1 isolator bodies, the horizontal force-displacement relationship for E2 isolator bodies was largely indistinguishable for total bond extents slightly larger than $B_{max}$, and no appreciable difference was noted between $B=B_{max}=33\%$ and B=50%. As the total bond extent was increased to B=75% it was observed that further softening was prevented at approximately 1.00 $t_r$. Review of the FEA revealed that the bond became effective at approximately 1.00 $t_r$, in preventing further rollover. The deformed shape at 2.00 $t_r$ is shown in FIG. 19. The shape factor of E2 isolator bodies is notably larger than that of E1 isolator bodies due to the use of thinner layers of elastomer. Consequently the inward bulging observed in the E1 isolator body with B=75% was not as well defined in the E2 isolator body with B=75%. In both cases full rollover was prevented and the free edge (initially vertical face) did not contact the supports. It was determined that the ratio of the horizontal force between B=75% and a fully bonded isolator, B=100%, at 2.00 $t_r$ was 88%. Similar to the E1 isolator body, it can be concluded that the restrained rollover section continues to provide substantial horizontal force resistance.

Despite having identical total bond extents of B=75%, the horizontal force-displacement relationship for the E1 and E2 isolator bodies diverged at different horizontal displacements, 0.75 $t_r$ and 1.00 $t_r$, respectively. In this respect, the total bond extent, B, is not sufficient alone to give an accurate indication of the influence of the bond on the horizontal force-displacement relationship of the isolator body. It has been shown that the total bond extent can be significantly extended beyond $B_{max}$ without notable change to the force-displacement relationship in comparison to an unbonded isolator. Without being limited by theory, it is postulated that the level that the bond can be extended without notable influence is dependent on the level of vertical deflection of the isolator body as previously discussed. It was observed that further softening was prevented when the bond prevented the loss of contact with the support.

Figure 20:
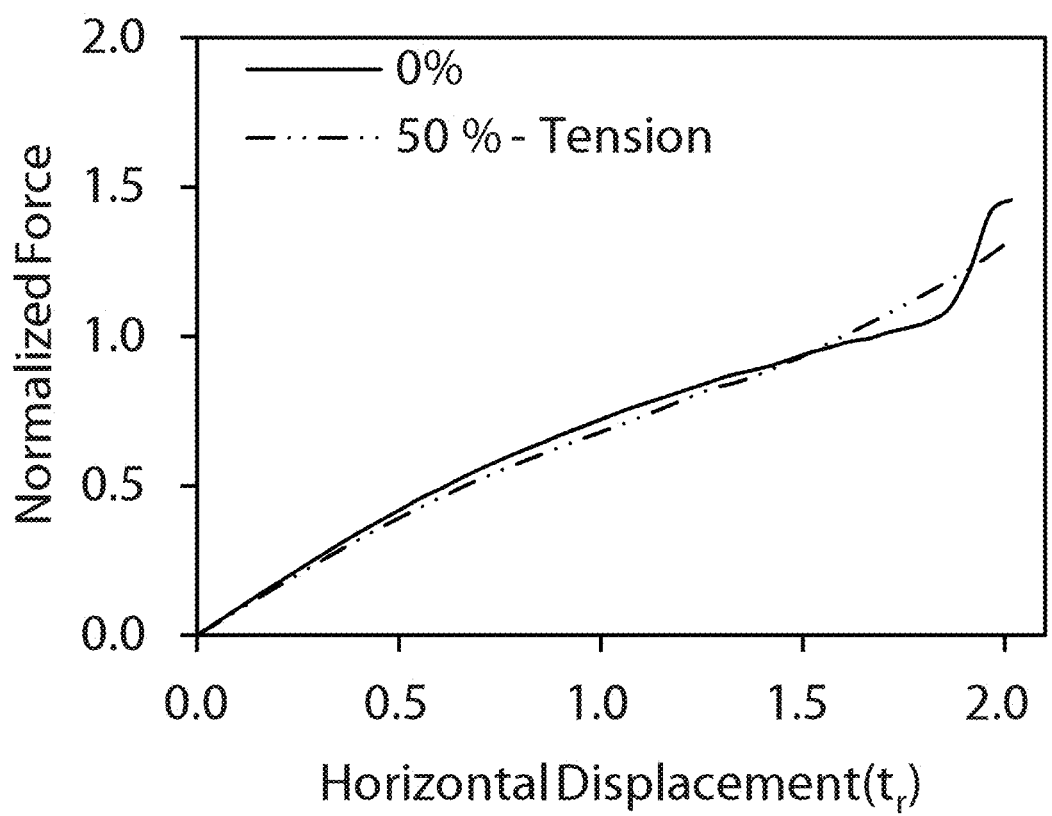
FIG. 20 shows the force-displacement relationship of isolator E1 with B=0% with 2.0 MPa average vertical compressive stress and B=50% under 0.2 MPa average vertical tensile stress.

One aspect of the concept of PB-FREIs is the ability to provide tensile resistance. Accordingly, the horizontal properties under a vertical tensile stress are important performance characteristics to investigate. The FEA was used to investigate the E1 isolator body with B=50% under vertical tensile stress. The isolator body was monotonically loaded to an average tensile stress of 0.2 MPa before being displaced horizontally to a maximum displacement of 2.00 $t_r$. FIG. 20 compares the horizontal force-displacement relationship of the tensile stress case to the reference unbonded case, conducted under a compressive stress of 2.0 MPa. It can be seen that despite the tensile stress, the isolator body still exhibits the softening and stiffening response associated with unbonded FREIs. While the response is similar to that of the reference case, the isolator body under tensile stress is initially softer. Due to the tensile load, the unbonded regions of the contact surface of the isolator body are not in contact with the supports. Subsequently, shear forces cannot be transferred through the unbonded regions at small displacements and the response of the isolator body is dominated by the bond. Therefore the isolator body initially acts as a reduced-width isolator body, similar to the pure tension case.

Figure 21A:
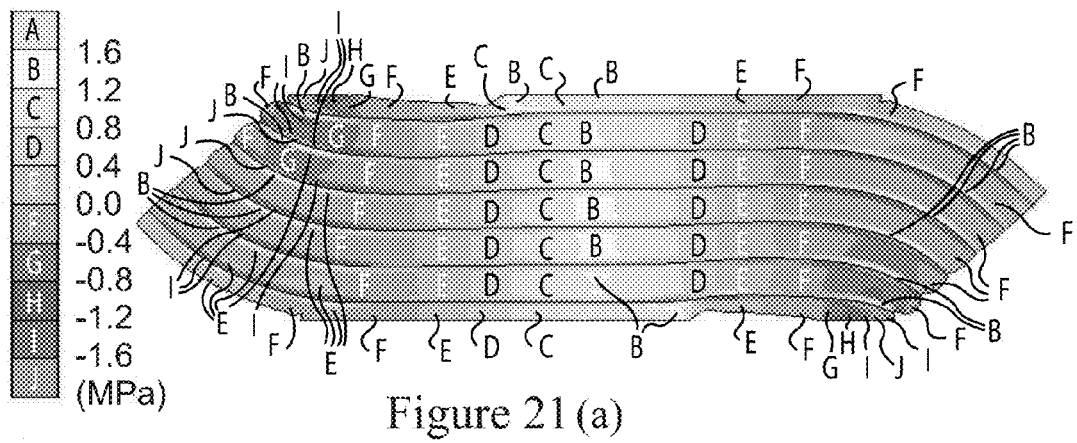
FIGS. 21(a), 21(b) and 21(c) show the local stress $S_{33}$ of isolator E2 with B=50% and 0.2 MPa average vertical tensile stress at, respectively, (a) 1.00 $t_r$, (b) 1.50 $t_r$, and (c) 2.00 $t_r$.
Figure 21B:
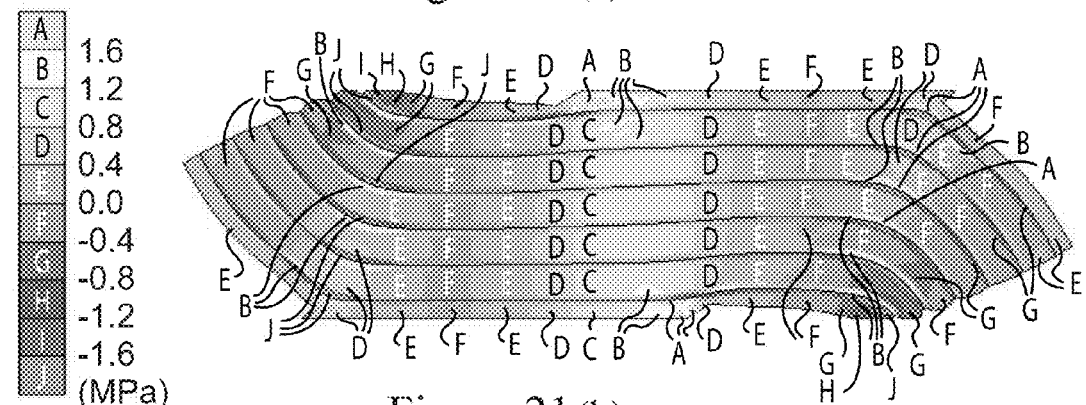

As the horizontal displacement increases, the rollover portions move in a rigid body mode until contacting the supports as shown in FIG. 21(a). It can be seen that the local coordinates $S_{33}$ stress contours are essentially the opposite of those previously observed for a partially bonded isolator under compression. The central portion of the isolator body is now dominated by a tensile stress whereas the rollover portions are largely in compression. Similar to full rollover of an unbonded FREI, the contact between the supports and the corner portions of the free edges adjacent the supports (upper left and lower right in FIG. 21(a)) is associated with an increase in horizontal resistance. As the horizontal displacement increases, increased contact between the free edge and the supports results in a contact compressive stress. The development of this compressive stress allows for horizontal forces to be transferred through the free edges to the rollover regions. In addition, conventional rollover occurs as the free edges (initially vertical faces) become horizontal and contact the supports. The deformed shape of the isolator body at a displacement of 1.50 $t_r$ is shown in FIG. 21(b). At this displacement the horizontal force begins to exceed the horizontal force of the unbonded reference case. Similar to the previously discussed partially bonded cases under compression, the bond restrains additional rollover, which prevents further softening. It can be seen that the part of the isolator body where the upper and lower bond overlap are dominated by tension. The remainder of the central portion displays both minor tensile and compressive stresses. The moment equilibrating compressive stress occurs where the free edges contact the support, where there is a comparatively large compressive stress concentration.

Figure 21C:
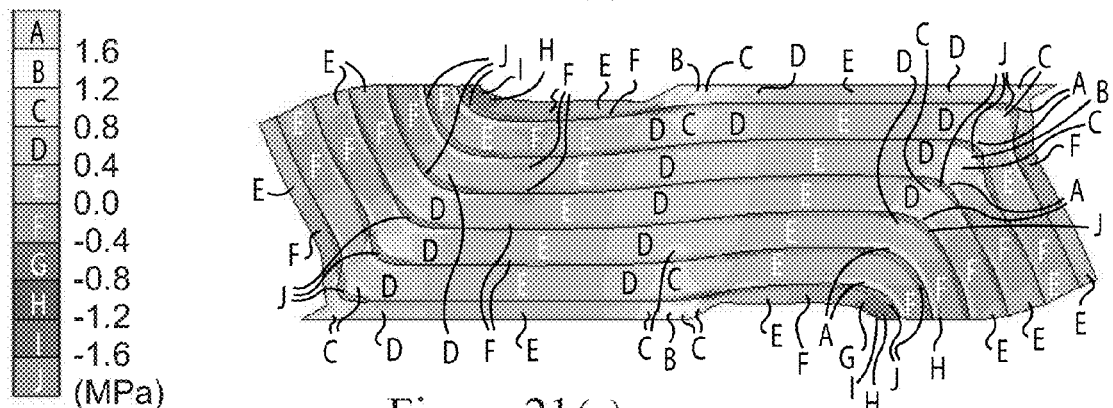

The tangential stiffness for displacements between 1.50 $t_r$ and 2.00 $t_r$ is approximately constant. Despite the large horizontal displacement the isolator body does not complete full rollover as regions of the free edges (initially vertical faces) of the isolator body do not contact the horizontal supports. The unique deformed shape at 2.00 $t_r$ is shown in FIG. 21(c). Throughout the levels of imposed horizontal displacement gaps between the contact surfaces and the supports developed. The central section of the isolator body is entirely in tension. Parts of the rollover portion have remained in contact with the supports, but the overall level of compressive stress has been significantly reduced. For isolator bodies displaced horizontally under a compressive stress, the horizontal force and vertical compressive stress act together to increase the moment on the isolator body that must be equilibrated. Conversely, the moment generated by the vertical tensile stress and horizontal force counteract each other, reducing or eliminating the necessity of the development of an equilibrating moment through changes in the vertical pressure distribution. Therefore, as the horizontal force increased, it reduced the compressive stress necessary to maintain moment equilibrium and consequently the compressive stresses generated due to contact of the rollover portions were reduced.

Regardless of the unique deformation and reduced contact area, the tangential stiffness remained positive over all levels of imposed displacement, maintaining stability. Furthermore, the overall force-displacement relationship remained comparable to the reference case of an unbonded FREI under compression. These findings suggest that PB-FREIs have the potential to provide tensile resistance without significantly altering the horizontal properties and performance of the isolator body.

Preliminary experimental and finite element analysis demonstrated that large portions of the isolator body could be bonded without notably influencing the rollover characteristics of the isolator body. From the experimental and finite element analysis conducted, the main observations are:

i. For isolators with an aspect ratio R>3.3 there exists a part of the isolator body that can be bonded without the bond entering the rollover section. Finite element analysis showed that isolators bonded up to this limit showed negligible influence of the bond in terms of the force-displacement response, deformed shape and local stress contours.

ii. Under pure tensile loading isolator develops a reduced effective width based on the total bond extent (at least where the bonds on both contact surfaces are of equal extent and in vertical registration with one another). Under identical average vertical stress, the magnitude of the stress observed in tension will be significantly greater than observed in compression due to the reduced effective width of the isolator body. Therefore the vertical modulus of a PB-FREI will be lower in tension than compression.

iii. It was observed that additional softening was avoided when the bonded region of the contact surface inhibited further loss of contact and inhibited additional rollover. The total bond extent that could be provided before a change in the horizontal force-displacement response was observed could be substantially larger than the maximum total bond extent determined from theory (at least where the bonds on both contact surfaces are of equal extent and in vertical registration with one another). Without being limited by theory, it is postulated that this is a consequence of the vertical deflection of the isolator body which inhibited loss of contact between the isolator body and the supports in the rollover section of the contact surface.

iv. Under vertical tensile stresses the isolator body can retain a positive incremental force-displacement relationship similar to that of a conventional unbonded FREI. The response of the isolator body was characterized by a central portion that formed around the bonded portion and two rollover portions.

REFERENCES

[1] Kelly J M. Analysis of fiber-reinforced elastomeric isolators. J Seismol Earthq Eng 1999; 2:19-34.

[2] Toopchi-Nezhad H, Tait M J, Drysdale, R G. Bonded versus unbonded strip fiber reinforced elastomeric isolators: Finite element analysis. Compos Struct 2011; 93:850-859.

[3] Toopchi-Nezhad H, Tait M J, Drysdale, R G. Testing and modeling of square carbon fiber-reinforced elastomeric seismic isolators. Struct Contr Health Monit 2008; 15:876-900.

[4] Magliulo G. Capozzi V. Fabbrocino G. Manfredi G. Neoprene-concrete friction relationships for seismic assessment of existing precast buildings. Eng Struct 2011; 33(2): 532-538.

[5] Foster B A D. Base isolation using Stable Unbonded Fibre Reinforced Elastomeric Isolators (SU-FREI): M.A.Sc. thesis. McMaster University; 2011.

[6] Russo G, Pauletta M. Sliding instability of fiber-reinforced elastomeric isolators in unbonded applications. Eng Struct 2013; 48: 70-80.

[7] Kelly J M, Konstantinidis D. Low-cost seismic isolators for housing in highly-seismic developing countries. Proceedings of the 10$^{th}$ World Conference on Seismic Isolation, Energy Dissipation and Active Vibrations Control of Structures. Turkey 2007.

[8] Russo G. Pauletta M, Cortesia A. A study on experimental shear behavior of fiber-reinforced elastomeric isolators with various fiber layouts, elastomers and aging conditions. Eng Struct 2013; 52: 422-433.

[9] Kelly J M, Konstantinidis D. Mechanics of Rubber Bearings for Seismic and Vibration Isolation. Chichester UK: John Wiley & Sons; 2011.

[10] Naeim F, Kelly J M. Design of Seismic Isolated Structures: From Theory to Practice, USA: John Wiley & Sons; 1999.

[11] de Raaf M. Experimental Study of Unbonded Fiber Reinforced Elastomeric Bearings: M.A.Sc. thesis. McMaster University; 2009.

[12] ISO. Elastomeric seismic-protection isolators. ISO 22762. Geneva: International Organization for Standardization; 2010.

ASCE-7. Minimum design loads for buildings and other structures, ASCE/SEI 7-10. New York, American Society of Civil Engineers; 2010.

[13] MSC Marc. Theory and user information, vol. A. MSC Software Corporation: Santa Ana, 2011.

One or more currently preferred embodiments have been described by way of example. It will be apparent to persons skilled in the art that a number of variations and modifications can be made without departing from the scope of the claims.

What is claimed is:

1. A reinforced elastomeric isolator, comprising:
   an isolator body, the isolator body having a laminate structure comprising:
      a plurality of layers of elastomeric material, two of which form external layers of the laminate structure and define opposed contact surfaces of the isolator body;
      a plurality of flexible layers of fiber reinforcement;
      each layer of fiber reinforcement being disposed between a pair of adjacent layers of elastomeric material;
      each pair of adjacent layers of elastomeric material being bonded together across the layer of fiber reinforcement disposed therebetween; and
      individual edges of the adjacent layers of elastomeric material that combine to form at least one generally planar free edge of the isolator body as a whole, the at least one free edge extending between the contact surfaces about a periphery of the isolator body; and
   a pair of opposed rigid supports;
   the opposed contact surfaces of the isolator body being bonded to respective ones of the opposed rigid supports by respective bonds so that the isolator body is between the opposed rigid supports;

characterized in that:
the bonds are disposed inwardly of at least one of the at least one free edge of the isolator body so as to permit stable rollover deformation of the isolator.

2. The reinforced elastomeric isolator of claim 1, wherein the isolator body has an aspect ratio (width over height) of at least about 3.3 where height is measured along the at least one free edge of the isolator body and width is measured along a displacement axis of the isolator body.

3. The reinforced elastomeric isolator of claim 2, wherein the bonds are disposed inwardly of rollover sections of the opposed contact surfaces.

4. The reinforced elastomeric isolator of claim 1, wherein, for at least one contact surface, at least one outermost bond is located a distance of at least about 5/3 h from the free edge of the isolator body, where h is a height of the isolator body as measured along the at least one free edge of the isolator body.

5. The reinforced elastomeric isolator of claim 4, wherein:
a width of the isolator body, measured along a displacement axis of the isolator body, is at least about (10/3 h+B) where B is a total bond extent; and
each outermost bond is located a distance of at least about 5/3 h from each free edge of the isolator body.

6. The reinforced elastomeric isolator of claim 1, wherein the at least one free edge of the isolator body is a single free edge forming a circle and which is generally planar when notionally unrolled.

7. The reinforced elastomeric isolator of claim 1, wherein the at least one free edge of the isolator body is four free edges forming a rectangle.

8. The reinforced elastomeric isolator of claim 1, wherein the bonds are formed by hot vulcanization.

9. The reinforced elastomeric isolator of claim 1, wherein the bonds are formed by cold vulcanization.

* * * * *